(12) United States Patent
Ueda et al.

(10) Patent No.: US 6,904,337 B2
(45) Date of Patent: Jun. 7, 2005

(54) POWER GENERATION CONTROL SYSTEM, POWER GENERATION CONTROL METHOD, PROGRAM, AND MEDIUM

(75) Inventors: Tetsuya Ueda, Kasugai (JP); Osamu Ogawa, Kyoto (JP); Jiro Suzuki, Nara (JP); Shinji Miyauchi, Shikigun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/148,845

(22) PCT Filed: Oct. 1, 2001

(86) PCT No.: PCT/JP01/08620

§ 371 (c)(1),
(2), (4) Date: Nov. 13, 2002

(87) PCT Pub. No.: WO02/29953

PCT Pub. Date: Apr. 11, 2002

(65) Prior Publication Data

US 2003/0180592 A1 Sep. 25, 2003

(30) Foreign Application Priority Data

Oct. 3, 2000 (JP) ........................................ 2000-303349
May 23, 2001 (JP) ........................................ 2001-154585

(51) Int. Cl.[7] .............................................. G05B 11/01
(52) U.S. Cl. ........................ 700/295; 700/22; 700/286; 429/22
(58) Field of Search .............................. 700/9, 22, 286, 700/287, 295–297; 429/12, 13, 22, 23

(56) References Cited

U.S. PATENT DOCUMENTS

| 4,839,574 A | | 6/1989 | Takabayashi ................ 320/101 |
| 5,539,653 A | * | 7/1996 | Pomatto ..................... 700/295 |
| 5,880,536 A | * | 3/1999 | Mardirossian ................ 307/44 |
| 6,157,874 A | * | 12/2000 | Cooley et al. .............. 700/295 |
| 6,406,806 B1 | * | 6/2002 | Keskula et al. ............... 429/13 |
| 6,495,277 B1 | * | 12/2002 | Edlund et al. ................ 429/22 |
| 6,534,950 B2 | * | 3/2003 | LeBoe ........................ 320/104 |
| 6,581,015 B2 | * | 6/2003 | Jones et al. .................. 702/60 |
| 2001/0034569 A1 | * | 10/2001 | Yamamoto et al. ......... 700/295 |
| 2003/0078797 A1 | * | 4/2003 | Kanbara et al. ................ 705/1 |

FOREIGN PATENT DOCUMENTS

| JP | 63-276877 | 11/1988 |
| JP | 02-291668 | 12/1990 |
| JP | 04-368428 | 12/1992 |
| JP | 05-36430 | 2/1993 |
| JP | 05-182675 | 7/1993 |
| JP | 06-110572 | 4/1994 |
| JP | 06-325774 | 11/1994 |
| JP | 07-57753 | 3/1995 |
| JP | 09-007618 | 1/1997 |

OTHER PUBLICATIONS

Japanese language search report for PCT/JP01/08620 dated Jan. 15, 2002.
English translation of Form PCT/ISA/210.

\* cited by examiner

*Primary Examiner*—Paul Rodriguez
(74) *Attorney, Agent, or Firm*—RatnerPrestia

(57) ABSTRACT

It has been difficult to reduce a waste of energy in a fuel cell power generating process when, for example, a temporary rise or drop of a power load occurs. A fuel cell power generation system includes: load detection means of detecting power requested by a load; and output control means of accumulating a time at which a detected power requested by the load is equal to or larger than a predetermined value when a fuel cell body does not generate power to be supplied to the load, and allowing the fuel cell body to start generating power to be supplied to the load according to a predetermined rule based on an accumulation result.

11 Claims, 16 Drawing Sheets

POWER GENERATION CONTROL SYSTEM, POWER GENERATION CONTROL METHOD, PROGRAM, AND MEDIUM

This application is a U.S. National Phase Application of PCT International Application No. PCT/JP01/08620.

TECHNICAL FIELD

The present invention relates to a power generation control system, a power generation control method, a program and a medium for supply of power to, for example, a domestic power load using a fuel cell, etc.

BACKGROUND ART (A) FIG. 11 shows a configuration of a conventional fuel cell power generation device (conventional technology 1) disclosed in Japanese Patent Laid-Open No. 7-57753. In FIG. 11, a fuel cell body 31 generates DC power by reaction between hydrogen supplied by hydrogen supply means 32 and oxygen in the air supplied by air supply means 33, and a power converter 34 outputs AC power after converting the DC power into the AC power. At an external load command, a power control unit 35 controls a flow rate control unit 36 and the power converter 34, the flow rate control unit 36 controls the flow rate of the hydrogen supply by the hydrogen supply means 32 and the flow rate of the air supply by the air supply means 33 such that the flow rates can be the optimum values, and the power converter 34 controls the amount of electricity output by the fuel cell body 31, thereby successfully controlling the output power. An excess power prevention means 39 including a power detector 37 and an arithmetic unit 38 is provided between the fuel cell body 31 and the power converter 34 so that the amount of electricity can be appropriately suppressed when there is a steep rise in electricity output.

FIG. 12 shows the configuration of the fuel cell power generation device (conventional technology 2) disclosed in Japanese Patent Laid-Open No. 6-325774. In FIG. 12, a fuel cell body 41 generates DC power by reaction between hydrogen supplied by hydrogen supply means 42 and oxygen in the air supplied by air supply means 43, and a power converter 44 outputs AC power after converting the DC power into the AC power. A control device 45 controls a charge/discharge device 46 and the power converter 44, and can control the power output depending on an external load by the discharge from the charge/discharge device 46 or the charge to the charge/discharge device 46 although the amount of electricity from the fuel cell body 41 is constant. In the fuel cell power generation device, since the amount of electricity from the fuel cell body 41 is constant when the power output is controlled depending on a fluctuating external load, the amount of charge or discharge of the charge/discharge device 46 becomes considerably large. Therefore, a large capacity charge/discharge device 46 is required, and the entire device is costly and needs a large installation space.

(B) The configuration of the conventional fuel cell power generation system (conventional technology 3) disclosed in Japanese Patent Laid-Open No. 5-182675 and others is described below by referring to FIG. 13 showing the configuration of the conventional fuel cell power generation system (conventional technology 3).

In FIG. 13, a fuel cell (body) 131 is connected to a load 134 through a battery 132 and an output control means 133 including an inverter.

The operations of the conventional fuel cell power generation system (conventional technology 3) are described below by referring to FIG. 14 which is a graph for explanation of an example of an operation pattern of the conventional fuel cell power generation system (conventional technology 3).

In FIG. 14, the horizontal and vertical axes respectively indicate the time and power, and reference numerals 141 and 142 respectively denote a load power and output power.

The load power 141 is rated power of W8c of the fuel cell body 131 from t2 to t3, and is W8d smaller than the rated power of the fuel cell body 131 from t1 to t2.

On the other hand, in the fuel cell body 131 (FIG. 13), the output control means 133 performs a continuous operation by the rated power W8c from t2 to t3, and performs an intermittent operation by the rated power W8c from t1 to t2 so that the same amount of electricity as the load power 141 can be obtained.

Therefore, the battery 132 (FIG. 13) puts on charge and discharge the redundant power and the insufficient power in the period from t1 to t2.

Since the fuel cell body 131 cannot continue generating power unless a high temperature can be constantly maintained, the energy such as the power for heating the fuel cell body 131 before generating power during power-up is required. Furthermore, since a stopping operation is performed by safely emitting hydrogen remaining in the path while cooling it, the energy such as power, etc. is also required.

Since an intermittent operation is performed in the above mentioned conventional fuel cell power generation system (conventional technology 3), energy is wasted each time power-up and power-down operations are performed.

Although the configuration of the fuel cell power generation system (conventional technology 4) is similar to that of the above mentioned fuel cell power generation system (conventional technology 3), the waste of the conventional technology can be avoided to a certain extent by changing the output power by following the load power as shown in FIG. 15 which is a graph for explanation of an example of an operation pattern of the conventional fuel cell power generation system (conventional technology 4).

In FIG. 15, the horizontal and vertical axes respectively indicate the time and the power. Reference numerals 143 and 144 respectively denote load power and output power. The load power 143 is high in the morning 143b, afternoon 143c, and evening 143d, and is low at midnight 143e and in the early morning 143a.

The operation of the fuel cell body is controlled by the output power 144 following the load power 143 between the maximum output power W9c and the minimum output power W9d. Since the fuel cell body 1 has a continuously inreasing amount of charge of the battery 132 with excess power when the load power 143 is smaller than the minimum output power W9d at midnight 143e and in the early morning 143a, the operation is stopped.

Thus, the conventional fuel cell power generation system (conventional technology 4) is generally activated and stopped once a day, thereby more successfully reducing the waste energy during the power-up and power-down than the above mentioned fuel cell power generation system (conventional technology 3).

(A) However, in the conventional fuel cell power generation device (conventional technology 1), when an external load command largely changes within a short time, the power control unit 35 has to control the output power by raising and dropping it within a short time, thereby possibly causing the hunting of output power because of the delay of control. As a results there can arise the problem that the operation of the fuel cell power generation device becomes unstable, the efficiency of the device is lowered, and the durability is shortened.

(B) Additionally, there has been the problem that the fuel cell power generation system (conventional technology 4) wastes energy when the operation as shown in FIG. 16 which is a graph for explanation of an example of another operation pattern of the conventional fuel cell power generation system (conventional technology 4) is performed.

To be more practical, in the conventional fuel cell power generation system (conventional technology 4), when there is a temporary rise 145*b* of load power 145 when the operation is stopped, for example, at midnight 145*e* or in the early morning 145*a*, the system is started but stopped soon. Furthermore, in the fuel cell power generation system (conventional technology 4), the stopping process is started but the activating process is soon performed when there is a temporary drop 145*d* of the load power 145 during the operation, for example, in the afternoon 145*c*, etc. Thus, energy is wasted in the originally unnecessary activating and stopping operations.

DISCLOSURE OF THE INVENTION

The present invention has been achieved to solve the above mentioned problems with the conventional technology, and aims at providing a power generation control system, a power generation control method, a program, and a medium for preventing the reduction of the durability by, for example, stabilizing the operation of the fuel cell power generation device and improving the efficiency.

The present invention has also been achieved to solve the problem with the conventional technology, and aims at providing a power generation control system, a power generation control method, a program, and a medium capable of minimizing the waste of energy even when there arise a temporary rise or drop of power load.

One aspect of the present invention is a power generation control system comprising:

power detection means of detecting power requested by a load; and power generation control means of controlling predetermined power generation means of generating all or a part of power to be supplied to the load using a command value generated in each second predetermined period based on an average value of the detected power in a first predetermined period.

Another aspect of the present invention is the power generation control system, wherein the command value generated in each second predetermined period is generated based on an average value in the first predetermined period with a starting time of the second predetermined period as an end time of the first predetermined period.

Still another aspect of the present invention is the power generation control system of the present invention, wherein:

said predetermined power generation means is a fuel cell; and excess or shortfall of the generated power relative to the requested power is adjusted using system power and/or battery.

Yet still another aspect of the present invention is the power generation control system of the present invention, wherein:

the excess or shortfall of the generated power can be adjusted using system power and battery; and said battery is used by priority over said system power.

Still yet another aspect of the present invention is the power generation control system of the present invention, wherein said control is performed with amount of accumulation of the battery taken into account.

A further aspect of the present invention is the power generation control system of the present invention, wherein said taking an amount of accumulation of the battery into account means amending the command value corresponding to the difference between the amount of accumulation and a predetermined target amount of accumulation.

A still further aspect of the present invention is a power generation control method, comprising the steps of:

detecting power requested by a load; and controlling a power generator in generating all or a part of the power to be supplied to the load using a command value generated in each second predetermined period based on an average value of the detected power in a first predetermined period.

A yet further aspect of the present invention is a power generation control system, comprising:

power detection means of detecting power requested by a load;

time accumulation means of accumulating a time at which the detected power requested by the load equal to or larger than a predetermined value when predetermined power generation means does not generate power to be supplied to the load; and power generation control means of allowing said power generation means to start generating the power to be supplied to the load using a predetermined rule based on the accumulation result.

Still yet further aspect of the present invention is the power generation control system of the present invention, wherein said predetermined rule refers to allowing said power generation means to start generating power to be supplied to the load when (1) a total period of the time continuously accumulated in a predetermined period or (2) a total period of the time discontinuously accumulated in a predetermined period exceeds a predetermined threshold.

An additional aspect of the present invention is the power generation control system of the present invention, wherein said time accumulation means outputs (1) the total period of the time continuously accumulated in the predetermined period or (2) the total period of the time discontinuously accumulated in the predetermined period as a result of the accumulation.

A still additional aspect of the present invention is the power generation control system of the present invention, wherein said predetermined rule refers to allowing said power generation means to start generating power to be supplied to the load when a total period of continuously accumulated time exceeds a predetermined threshold.

A yet additional aspect of the present invention is a power generation control system, comprising:

power detection means of detecting power requested by a load;

time accumulation means of accumulating a time at which the detected power requested by the load equal to or smaller than a predetermined value when predetermined power generation means generates power to be supplied to the load; and power generation control means of allowing said power generation means to stop generating the power to be supplied to the load using a predetermined rule based on the accumulation result.

A still yet additional aspect of the present invention is a power generation control system, comprising:

power detection means of detecting power requested by a load;

power accumulation means of accumulating power requested by the load in a predetermined period when predetermined power generation means does not generate power to be supplied to the load; and power generation control means of allowing said power generation means to start generating the power to be supplied to the load using a predetermined rule based on the accumulation result.

A supplementary aspect of the present invention is the power generation control system of the present invention, wherein said predetermined rule refers to allowing said power generation means to start generating power to be supplied to the load when the accumulated power exceeds a predetermined threshold.

A still supplementary aspect of the present invention is a power generation control system, comprising:

power detection means of detecting power requested by a load;

power accumulation means of accumulating power requested by the load in a predetermined period when predetermined power generation means generates power to be supplied to the load; and power generation control means of allowing the power generation means to stop generating the power to be supplied to the load using a predetermined rule based on the accumulation result.

A yet supplementary aspect of the present invention is a power generation control system, comprising:

record accumulation means of accumulating a record of power requested by a load when predetermined power generation means generates power to be supplied to the load according to a predetermined rule; and power generation control means of allowing the power generation means to start or stop generating power to be supplied to the load according to the accumulated record by priority over the rule.

A still yet supplementary aspect of the present invention is the power generation control system of the present invention, wherein:

a time at which said power generation means is allowed to start or stop generating power to be supplied to the load is computed based on the accumulated record; and said power generation means is allowed to start or stop generating power to be supplied to the load practically at the computed time.

Another aspect of the present invention is a power generation control method, comprising the steps of:

detecting power request by a load;

accumulating a time at which the detected power requested by the load indicates a value equal to or larger than a predetermined value when predetermined power generation means does not generate power to be supplied to the load; and allowing said power generation means to start generating the power to be supplied to the load using a predetermined rule based on the accumulation result.

Still another aspect of the present invention is a power generation control method, comprising the steps of:

detecting power requested by a load;

accumulating a time at which the detected power requested by the load indicates a value equal to or smaller than a predetermined value when predetermined power generation means generates power to be supplied to the load; and allowing said power generation means to stop generating the power to be supplied to the load using a predetermined rule based on the accumulation result.

Yet still another aspect of the present invention is a power generation control method, comprising the steps of:

detecting power requested by a load;

accumulating power requested by the load in a predetermined period when a power generator does not generate power to be supplied to the load; and allowing said power generator to start generating the power to be supplied to the load using a predetermined rule based on the accumulation result.

Still yet another aspect of the present invention is a power generation control method, comprising the steps of:

detecting power requested by a load;

accumulating power requested by the load in a predetermined period when a power generator generates power to be supplied to the load; and allowing the power generator to stop generating the power to be supplied to the load using a predetermined rule based on the accumulation result.

A further aspect of the present invention is a power generation control method, comprising the steps of:

accumulating a record of power requested by a load when predetermined power generation means generates power to be supplied to the load according to a predetermined rule; and allowing the power generation means to start or stop generating power to be supplied to the load according to the accumulated record by priority over the rule.

A still further aspect of the present invention is a computer program product being used to direct a computer to function as all or a part of the power generation control system of the present invention; comprising:

power detection means of detecting power requested by a load; and power generation control means of controlling predetermined power generation means of generating all or a part of power to be supplied to the load using a command value generated based on an average value of the detected power in a first predetermined period in each second predetermined period.

A yet further aspect of the present invention is a computer program product being used to direct a computer to function as all or a part of the power generation control system of the present invention, comprising:

power detection means of detecting power requested by a load;

time accumulation means of accumulating a time at which the detected power requested by the load indicates a value equal to or larger than a predetermined value when predetermined power generation means does not generate power to be supplied to the load; and power generation control means of allowing said power generation means to start generating the power to be supplied to the load using a predetermined rule based on the accumulation result.

A still yet further aspect of the present invention is a computer program product being used to direct a computer to function as all or a part of the power generation control system, comprising:

power detection means of detecting power requested by a load;

time accumulation means of accumulating a time at which the detected power requested by the load indicates a value equal to or smaller than a predetermined value when predetermined power generation means generates power to be supplied to the load; and power generation control means of allowing said power generation means to stop generating the power to be supplied to the load using a predetermined rule based on the accumulation result.

A yet further aspect of the present invention is a computer program product being used to direct a computer to function as all or a part of the power, generation control system, comprising:

power detection means of detecting power requested by a load;

power accumulation means of accumulating power requested by the load in a predetermined period when predetermined power generation means does not generate power to be supplied to the load; and power generation control means of allowing said power generation means to start generating the power to be supplied to the load using a predetermined rule based on the accumulation result.

A still yet further aspect of the present invention is a computer program product being used to direct a computer to function as all or a part of the power generation control system, comprising:

power detection means of detecting power requested by a load;

power accumulation means of accumulating power requested by the load in a predetermined period when predetermined power generation means generates power to be supplied to the load; and power generation control means of allowing the power generation means to stop generating the power to be supplied to the load using a predetermined rule based on the accumulation result.

An additional aspect of the present invention is a computer program product being used to direct a computer to function as all or a part of the power generation control system, comprising:

record accumulation means of accumulating a record of power requested by a load when predetermined power generation means generates power to be supplied to the load according to a predetermined rule; and power generation control means of allowing the power generation means to start or stop generating power to be supplied to the load according to the accumulated record by priority over the rule.

A still additional aspect of the present invention is a computer-processible medium storing a program being used to direct a computer to function as all or a part of the power generation control system, comprising:

power detection means of detecting power requested by a load; and power generation control means of controlling predetermined power generation means of generating all or a part of power to be supplied to the load using a command value generated based on an average value of the detected power in a first predetermined period in each second predetermined period.

A yet additional aspect of the present invention is a computer-processible medium storing a program being used to direct a computer to function as all or a part of the power generation control system, comprising:

power detection means of detecting power requested by a load;

time accumulation means of accumulating a time at which the detected power requested by the load indicates a value equal to or larger than a predetermined value when predetermined power generation means does not generate power to be supplied to the load; and power generation control means of allowing said power generation means to start generating the power to be supplied to the load using a predetermined rule based on the accumulation result.

A still yet additional aspect of the present invention is a computer-processible medium storing a program being used to direct a computer to function as all or a part of the power generation control, system, comprising:

power detection means of detecting power requested by a load;

time accumulation means of accumulating a time at which the detected power requested by the load indicates a value equal to or smaller than a predetermined value when predetermined power generation means generates power to be supplied to the load; and power generation control means of allowing said power generation means to stop generating the power to be supplied to the load using a predetermined rule based on the accumulation result.

A supplementary aspect of the present invention is a computer-processible medium storing a program being used to direct a computer to function as all or a part of the power generation control system, comprising:

power detection means of detecting power requested by a load;

power accumulation means of accumulating power requested by the load in a predetermined period when predetermined power generation means does not generate power to be supplied to the load; and power generation control means of allowing said power generation means to start generating the power to be supplied to the load using a predetermined rule based on the accumulation result.

A still supplementary aspect of the present invention is a computer-processible medium storing a program being used to direct a computer to function as all or a part of the power generation control system, comprising:

power detection means of detecting power requested by a load;

power accumulation means of accumulating power requested by the load in a predetermined period when predetermined power generation means generates power to be supplied to the load; and power generation control means of allowing the power generation means to stop generating the power to be supplied to the load using a predetermined rule based on the accumulation result.

A still supplementary aspect of the present invention is a computer-processible medium storing a program being used to direct a computer to function as all or a part of the power generation control system, comprising:

record accumulation means of accumulating a record of power requested by a load when predetermined power generation means generates power to be supplied to the load according to a predetermined rule; and power generation control means of allowing the power generation means to start or stop generating power to be supplied to the load according to the accumulated record by priority over the rule.

Figure 1:
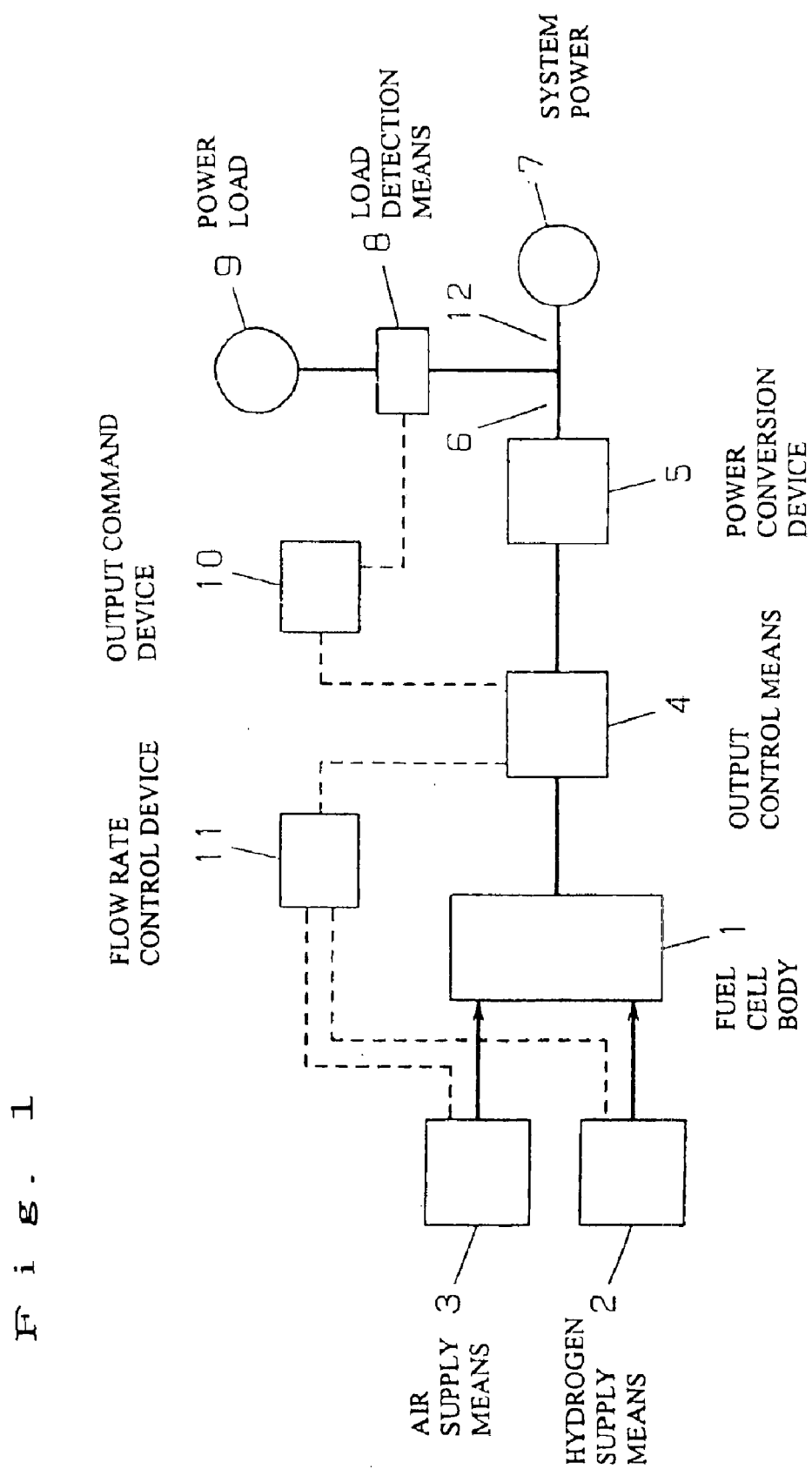
FIG. 1 shows a configuration of a system of a fuel cell power generation device according to a first embodiment of the present invention.

DESCRIPTION OF SYMBOLS 1 fuel cell body
2 hydrogen supply means
3 air supply means
4 output control means
5 power conversion device
6 output line
7 system power
8 load detection means
9 power load
10 output command device
11 flow rate control device
12 system power connection line
21 accumulation means
22 connection line
23 accumulation amount control device
24 accumulation amount detection means

BEST MODE FOR CARRYING OUT THE INVENTION

The embodiments according to the present invention will be described below by referring to the attached drawings.

Embodiment 1

First, a configuration of a fuel cell power generation device according to a first embodiment of the present invention will be described below by referring to FIG. 1 showing the configuration of the system of the fuel cell power generation device according to the first embodiment of the present invention.

To a fuel cell body 1, hydrogen supply means 2 represented by a reformer, a hydrogen storage alloy, a hydrogen bomb, etc., and air supply means 3 represented by an air blower, a blower pump, etc. are connected. One terminal of output control means 4 is electrically connected to the fuel cell body 1, and another terminal is electrically connected to a power conversion device 5. An output line 6 is electrically connected to the power conversion device 5, branched in the line, one terminal is electrically connected to a system power 7 through a system power connection line 12 while another terminal is electrically connected to load detection means 8 and a power load 9. Output command device 10 issues an output command to the output control means 4, and a flow rate control device 11 controls the hydrogen supply means 2 and the air supply means 3.

The output control means 4, the output command device 10, and the means including the flow rate control device 11 correspond to the power generation control means according to the present invention, and the load detection means 8 corresponds to power detection means according to the present invention. The fuel cell power generation device according to the first embodiment of the present invention corresponds to means including the power generation control system according to the present invention.

Described below will be the operation of the fuel cell power generation device according to the first embodiment of the present invention. While describing the operation of the fuel cell power generation system according to the first embodiment of the present invention, an embodiment of the power generation control method according to the present invention is also described (as in the following descriptions).

The hydrogen supplied by the hydrogen supply means 2 reacts with the oxygen in the air supplied by the air supply means 3 in the fuel cell body 1 to generate DC power. The amount of electricity of the generated DC power is controlled by the output control means 4, then transmitted to the power conversion device 5, converted into AC power having the same voltage as the system power 7, and supplied to the power load 9 through the output line 6. At this time, power conversion efficiency indicates how the input power into the power conversion device 5 is converted into the output power from the power conversion device 5. If the output power of the fuel cell body 1 is short relative to the load power of the power load 9, the power is also supplied by the system power 7. On the other hand, if the output power is excessive relative to the load power, then the power is returned to the system power 7, thereby performing a system linkage operation.

An object of the power generation by a fuel cell power generation device is to obtain the economical efficiency by the high efficiency. However, when the output power is short relative to the load power, power is purchased from the system power 7. On the other hand, when the output power is excessive relative to the load power, the purchased power is returned at a low price to the system power 7, thereby normally lowering the economical efficiency. Therefore, it is demanded that the output power can closely follow the change of the load power such that the output power can be prepared in proper quantities relative to the load power.

As means of following the load power, the load detection means 8 first detects the load power of the power load 9. Based on the detection result, the output command device 10 issues an output command value to the output control means 4, the output control means 4 controls the DC power generated by the fuel cell body 1 at the request value. Depending on the DC power value, the flow rate control device 11 controls the hydrogen flow rate from the hydrogen supply means 2 and the air flow rate from the air supply means 3 at the appropriate value. The output power can be controlled only by the output control means 4 performing the DC power control. However, if the hydrogen flow rate to the fuel cell body 1 is constant, and a smaller amount of DC power is generated by the fuel cell body 1, then the ratio of the hydrogen (hydrogen utilization rate) reacting in the fuel cell body 1 is reduced and a large volume of hydrogen is wasted, thereby exceedingly lowering the efficiency. Thus, by the flow rate control device 11 controlling the hydrogen flow rate and the air flow rate at the appropriate value, the efficiency can be optimally maintained.

In a series of following controlling processes, the load power can incessantly change within a short time. If the load power is used as an output command as is, the DC power rises or drops within a short time, thereby causing the trouble that the delay of control induces hunting and an unstable operation of the fuel cell power generation device. Furthermore, when a reformer for generating hydrogen from a hydrocarbon fuel by catalysis is used as the hydrogen supply means 2, the process by catalysis cannot follow an instant change of an output command value, thereby causing the problem of lowered efficiency and reduced durability.

Figure 3:
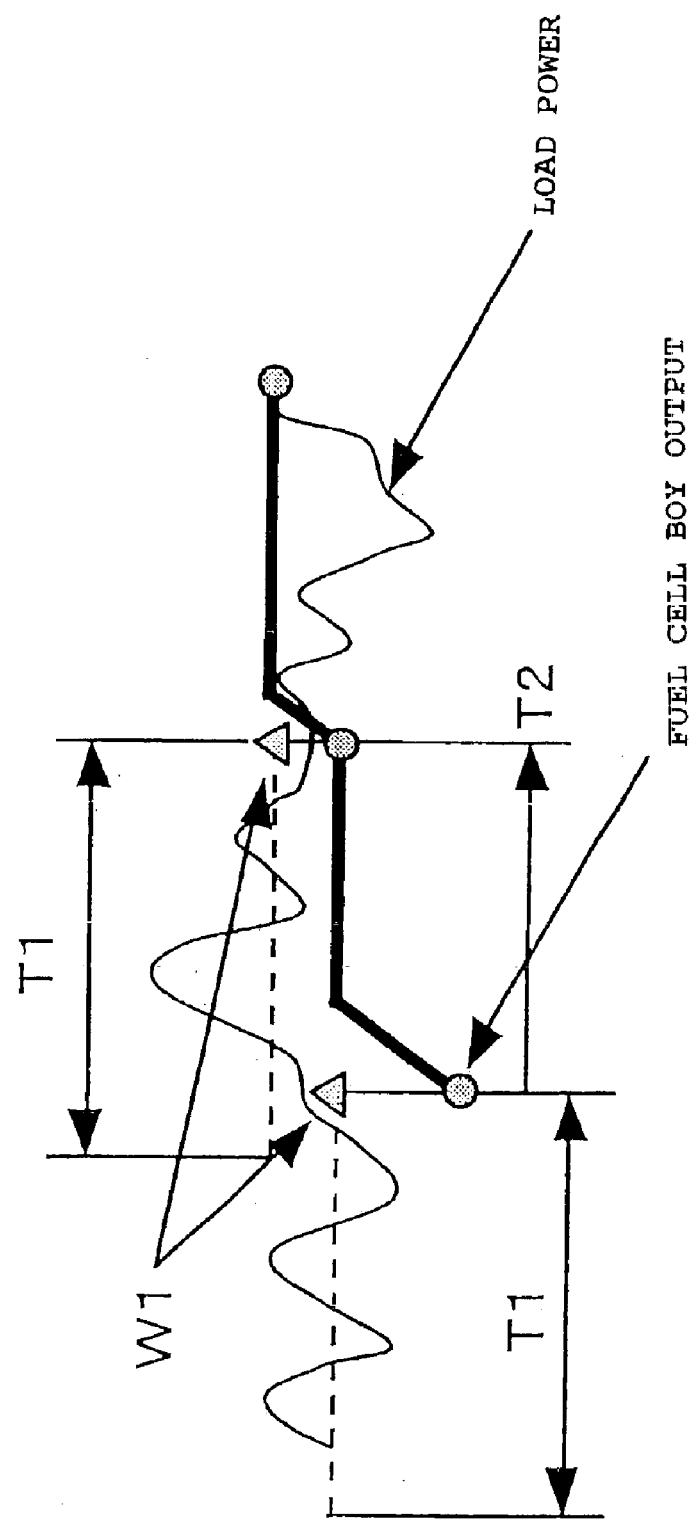
FIG. 3 shows a controlling operation of the fuel cell power generation device according to the first embodiment of the present invention.

According to an embodiment of the present invention, as shown in FIG. 3 showing the fuel cell power generation device according to the first embodiment of the present invention, the output command device 10 computes an output command by obtaining an average value of the load power in the period of time T1 (first predetermined period) with the power conversion efficiency taken into account, and sets the output command value as a DC power value to be set by the output control means 4 every time T2 (second predetermined period). Using the average value of the load power in the time T1 for an output command value, an appropriate output command can be issued regardless of an instant change, and using an output command every time T2, the device can be operated depending on its response time (time T2 (second predetermined period) (The command value generated each time T2 (second predetermined period) is based on the average value in the period of the time T1 (first predetermined period) ending at the starting time of the second predetermined period.

As an example, when the optimum control value in the domestic operation of a solid polymer fuel cell power generation device of 1.5 KW output is obtained, a result of T1=3 minutes and T2=1 minute indicating T1:T2= approximately 3:1 is output. That is, in this example, the optimum operation control can be performed by issuing an output command value based on an average load power in 3 minutes to a device each minute.

Thus, according to the first embodiment Of the present invention, the optimum output command can be issued regardless of an instant change by applying an average value in the period of the time T1 of the load power to an output command value, and an operation of a device can be optimally performed corresponding to the response time of the device by issuing an output command each time T2. As a result, the fuel cell power generation device can be stably operated with high efficiency and longer durability.

Embodiment 2

Figure 2:
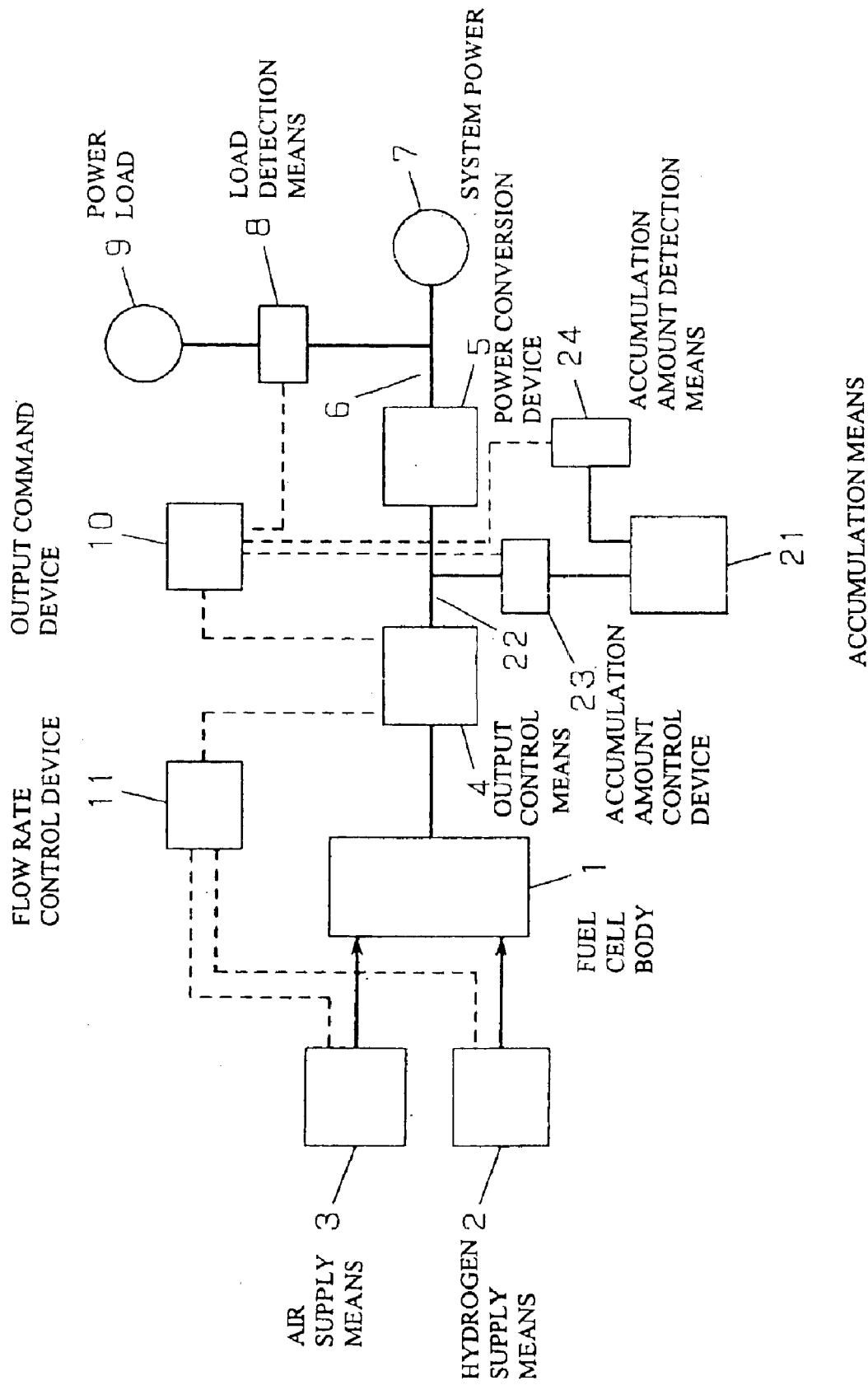
FIG. 2 shows a configuration of a system of a fuel cell power generation device according to a second embodiment of the present invention.

The configuration of the fuel cell power generation device according to a second embodiment of the present invention will be described below by referring to FIG. 2 showing the configuration of the system of the fuel cell power generation device according to a second embodiment of the present invention. The means also appearing in the above mentioned first embodiment is assigned the same reference numeral, and the explanation is omitted here.

Accumulation means 21 is branched from a connection line 22 connecting the output control means 4 to the power conversion device 5, and connected through an accumulation amount control device 23. Accumulation amount detection means 24 is connected to the accumulation means 21. An object of providing the accumulation means 21 is to solve the problem with the first embodiment that the economical efficiency is reduced in the system linkage operation by adjusting the power relating to the system power 7 due to the excess or deficient output power relative to the load power. That is, using the charge/discharge of the accumulation means 21, the amount of power supply from the system power 7 and the amount of return power to the system power 7 can be minimized, thereby improving the economical efficiency (the accumulation means 21 (battery) is used by priority over the system power 7).

Figure 4:
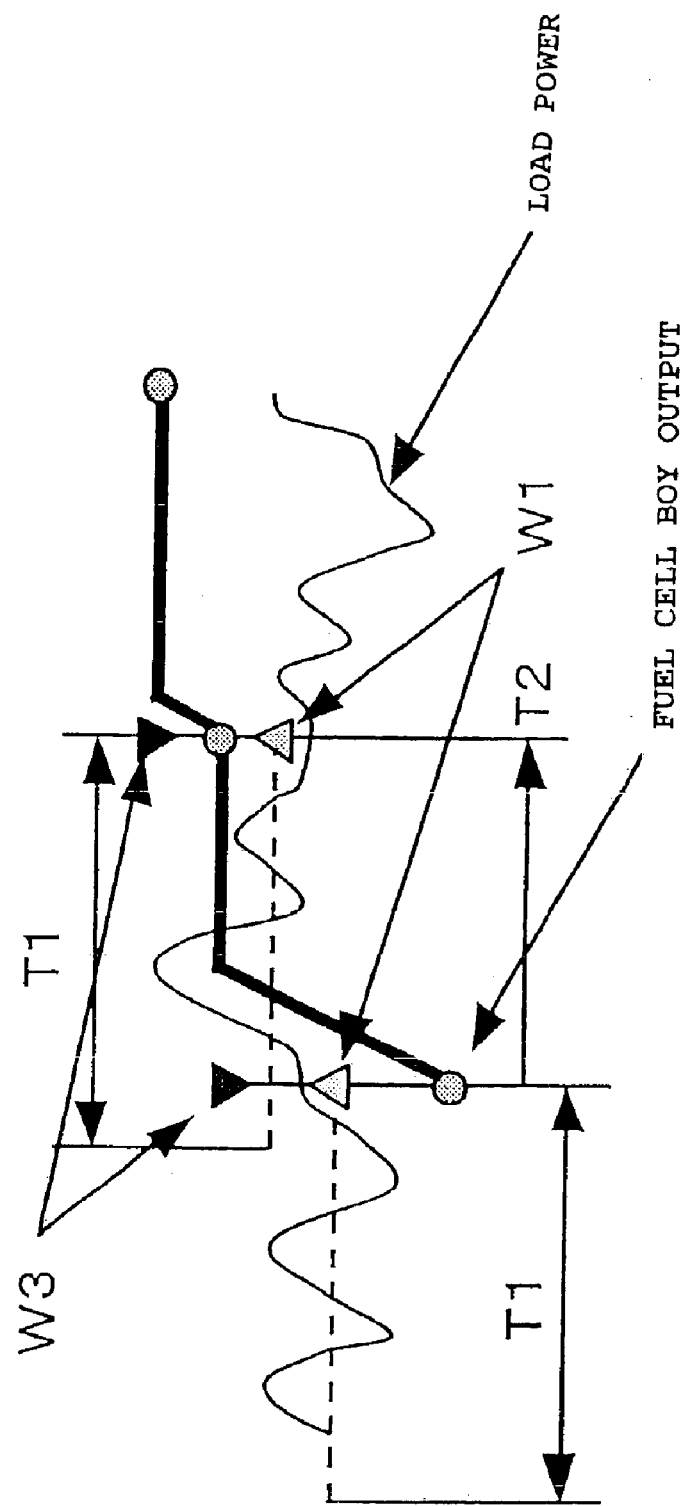
FIG. 4 shows a controlling operation of the fuel cell power generation device according to the second embodiment of the present invention.

Described below will be the operation of the fuel cell power generation device according to the second embodiment of the present invention. As shown in FIG. 4, the output command device 10 operates an average power W1 in the period of time T1 of the load power detected by the load detection means 8. The power W2 (=Q3/T2) is obtained by dividing the shortage of accumulation Q3 (=Q2−Q1) which is a difference between the current amount of accumulation Q1 detected by the accumulation amount detection means 24 and the target amount of accumulation Q2 by the time T2. The power W2 is added to the average power W1 to obtain W3 (=W1+W2). Then, an output command value is obtained from the W3 with the power conversion efficiency taken into account, and the DC power value of the fuel cell body 1 corresponding to the output command value is issued to the output control means 4 each time T2. The output command value is defined as the DC power value set each time T2 by the output control means 4. In addition, the shortage of accumulation Q3 is controlled to be accumulated in the accumulation means 21 by the accumulation amount control device 23 (a command value is amended depending on the difference between an amount of accumulation and a predetermined target amount of accumulation).

The series of the above mentioned controlling operations are performed by adding the accumulation amount control to the following control (refer to FIG. 3) according to the first embodiment of the present invention. When the average power W1 is defined as an output command value as is, then the amount of accumulation is not controlled, thereby possibly accumulating the difference between the target amount of accumulation Q2 and the current amount of accumulation Q1 gradually. For example, when the amount of accumulation gradually decreases with the amount of discharge exceeding the amount of charge, the accumulation means 21 of a large capacity is to be prepared not to reduce the amount of accumulation down to zero, thereby requiring the higher cost and larger device installation space. Therefore, according to the second embodiment of the present invention, an output command value is obtained by taking the power conversion efficiency into account for W3 (=W1+W2) obtained by adding the power W2 (=Q3/T2) compensating for the shortage of accumulation Q3 (=Q2−Q1) in the time period T2 for specification of the output command value. Thus, the amount of accumulation is controlled to constantly converge into the target amount of accumulation Q2, thereby minimizing the requirements for the accumulation means 21.

Thus, according to the second embodiment of the present invention, the requirements for the accumulation means 21 can be minimized by controlling the amount of accumulation to converge into the target amount of accumulation Q2, thereby reducing the cost and size of the device.

In the above mentioned first and second embodiments of the present invention, the predetermined period T1 used for obtaining the average power W1 and the predetermined period T2 used for issuing a command value to the output control means can satisfy the expression of T1≧T2 (where T1 can be a period equal to or longer than 1 second, and equal to or shorter than 1 hour).

Embodiment 3

Figure 10:
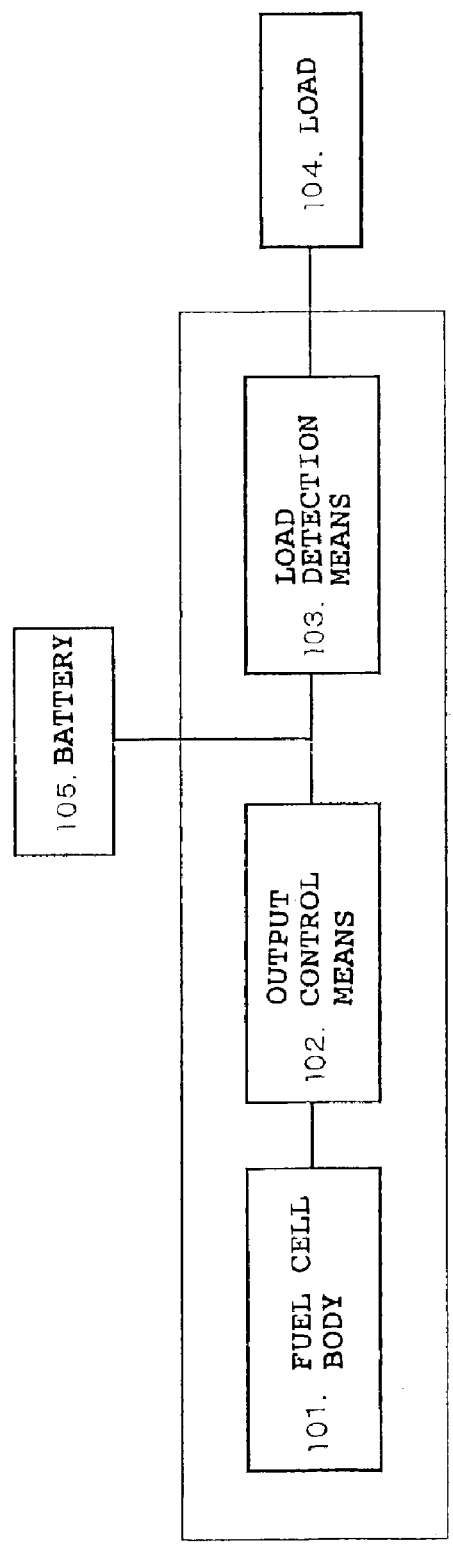
FIG. 10 shows a configuration of the system of the fuel cell power generation system according to the third embodiment of the present invention.
Figure 11:
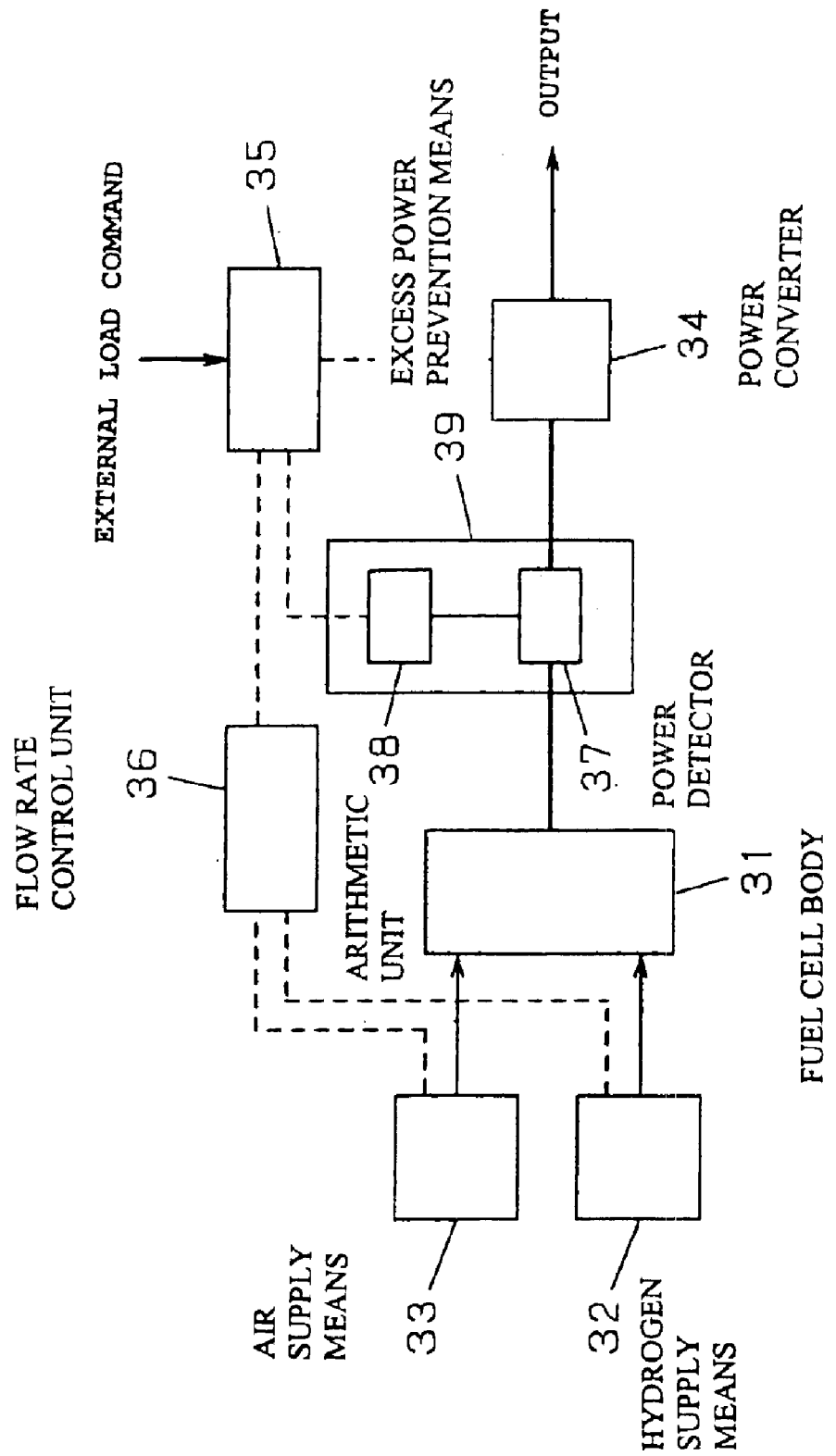
FIG. 11 shows a configuration of a system of a conventional fuel cell power generation device (conventional technology 1)
Figure 12:
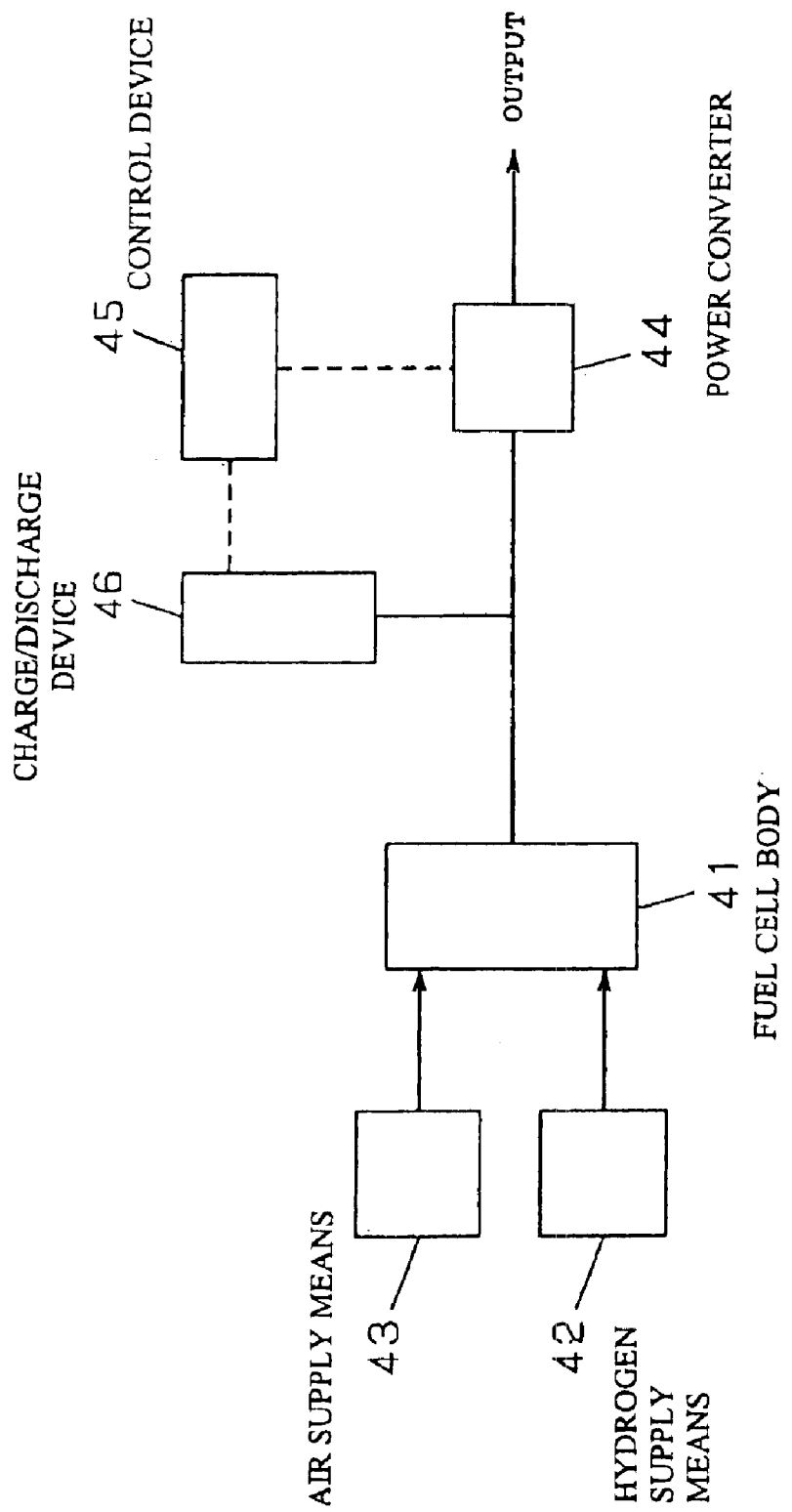
FIG. 12 shows a configuration of a system of a conventional fuel cell power generation device (conventional technology 2)
Figure 13:
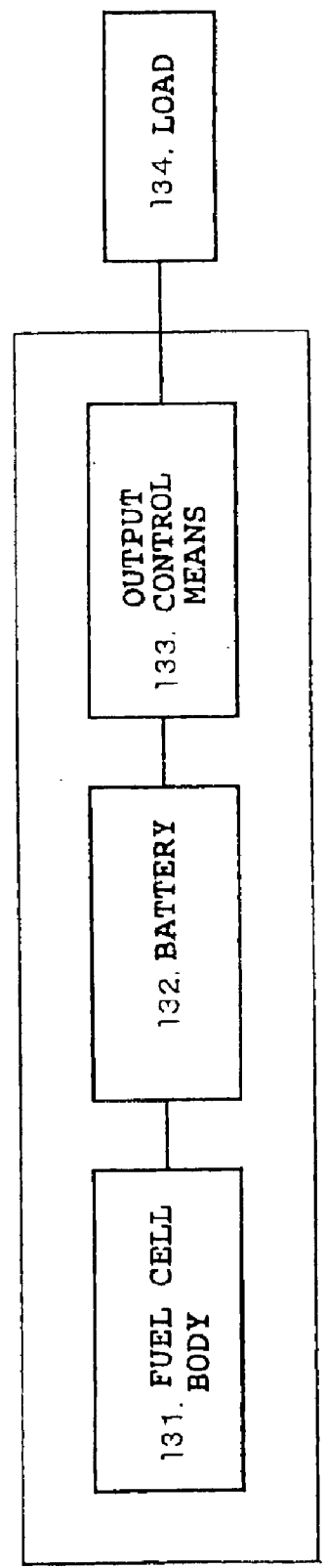
FIG. 13 shows a configuration of a system of a conventional fuel cell power generation system (conventional technology 3)
Figure 14:
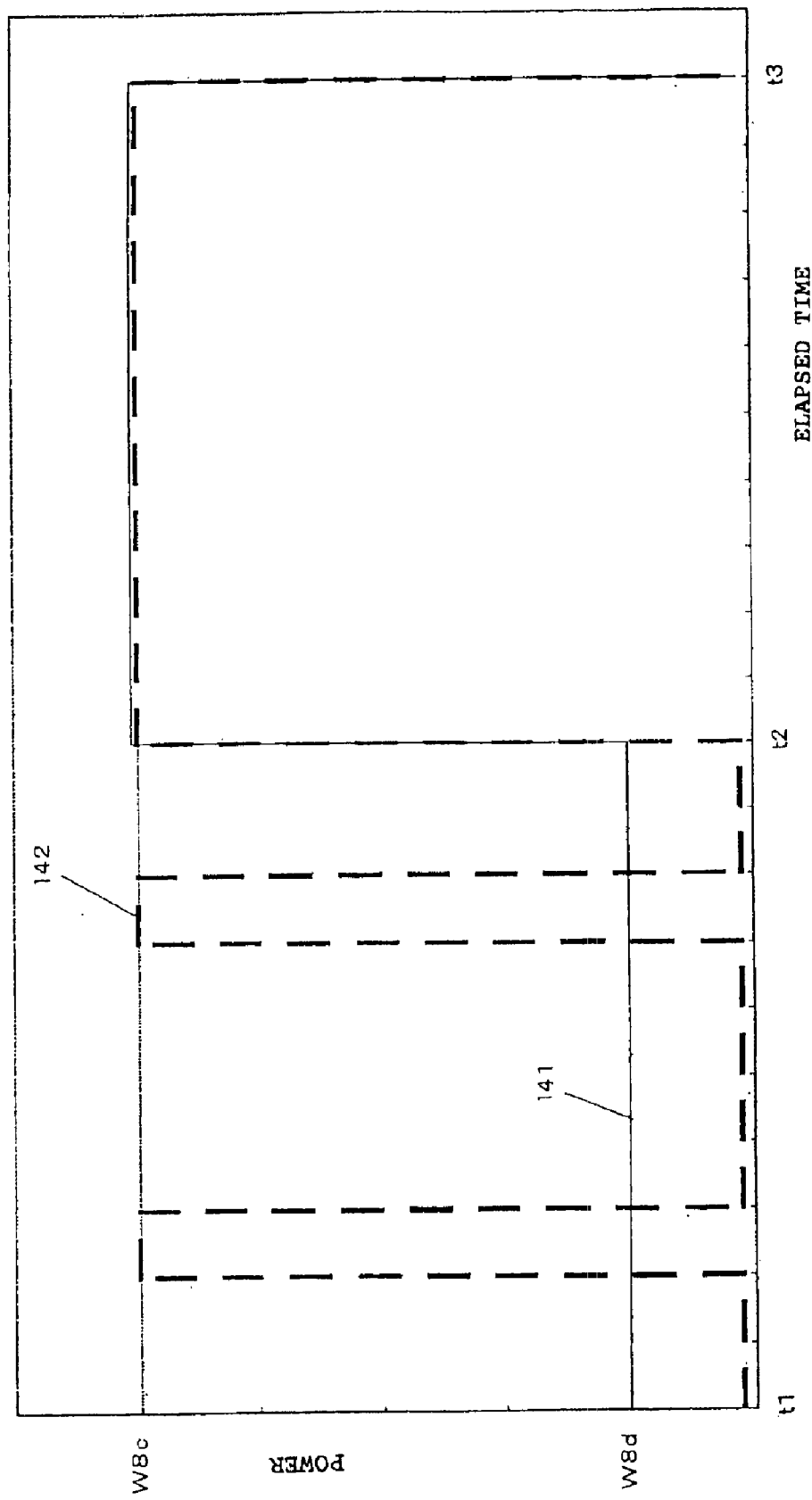
FIG. 14 is a graph for explanation of an example of an operation pattern of a conventional fuel cell power generation system (conventional technology 3)
Figure 15:
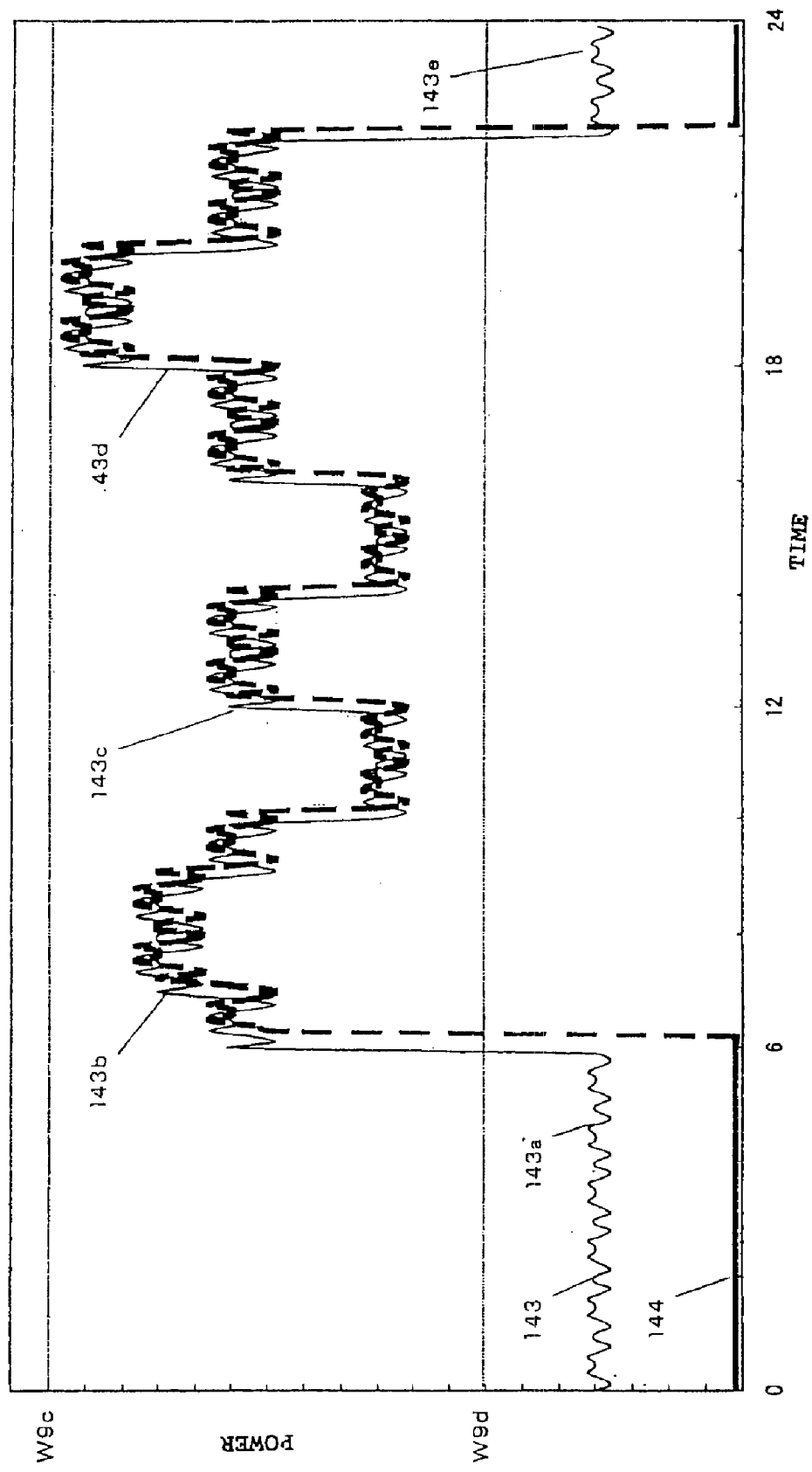
FIG. 15 is a graph for explanation of an example of an operation pattern of a conventional fuel cell power generation system (conventional technology 4)
Figure 16:
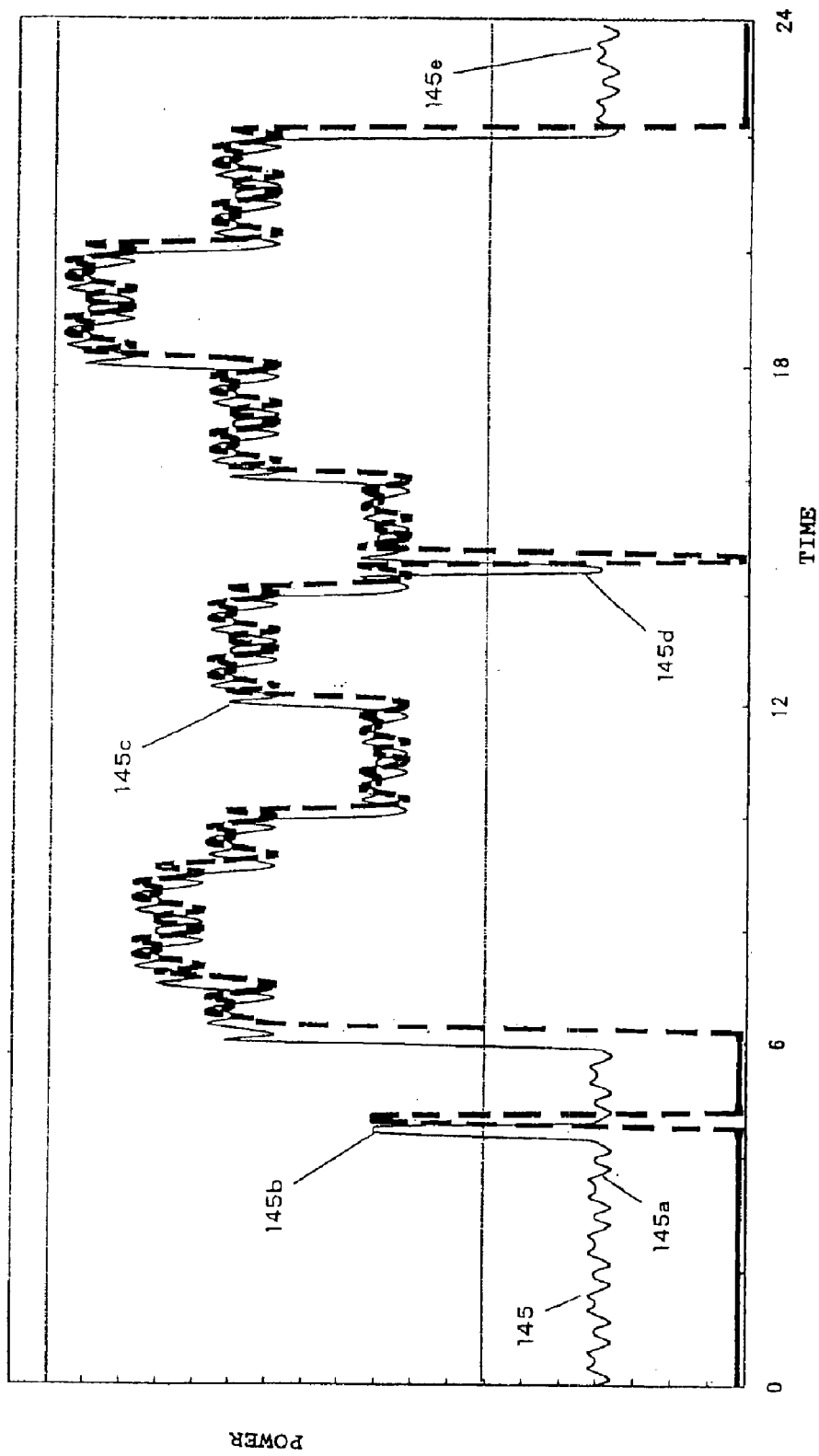
FIG. 16 is a graph for explanation of another example of an operation pattern of a conventional fuel cell power generation system (conventional technology 4).

Then, the configuration of the fuel cell power generation system according to a third embodiment of the present Invention is described below by referring to FIG. 10 showing the configuration of the fuel cell power generation system of the third embodiment of the present invention.

In FIG. 10, the fuel cell body 101, output control means 102, and load detection means 103 are serially connected in this order, a load 104 wastes the power connected to the load detection means 103, and a battery 105 is branched and connected from the connection portion between the output control means 102 and the load detection means 103.

The fuel cell body 101 corresponds to means including the power generation means according to the present invention, the load detection means 103 corresponds to means including the power detection means according to the present invention, the output control means 102 corresponds to means including the power generation control means and the time accumulation means according to the present invention. The fuel cell power generation system according to the third embodiment of the present invention corresponds to means including the power generation control system according to the present invention.

Figure 5:
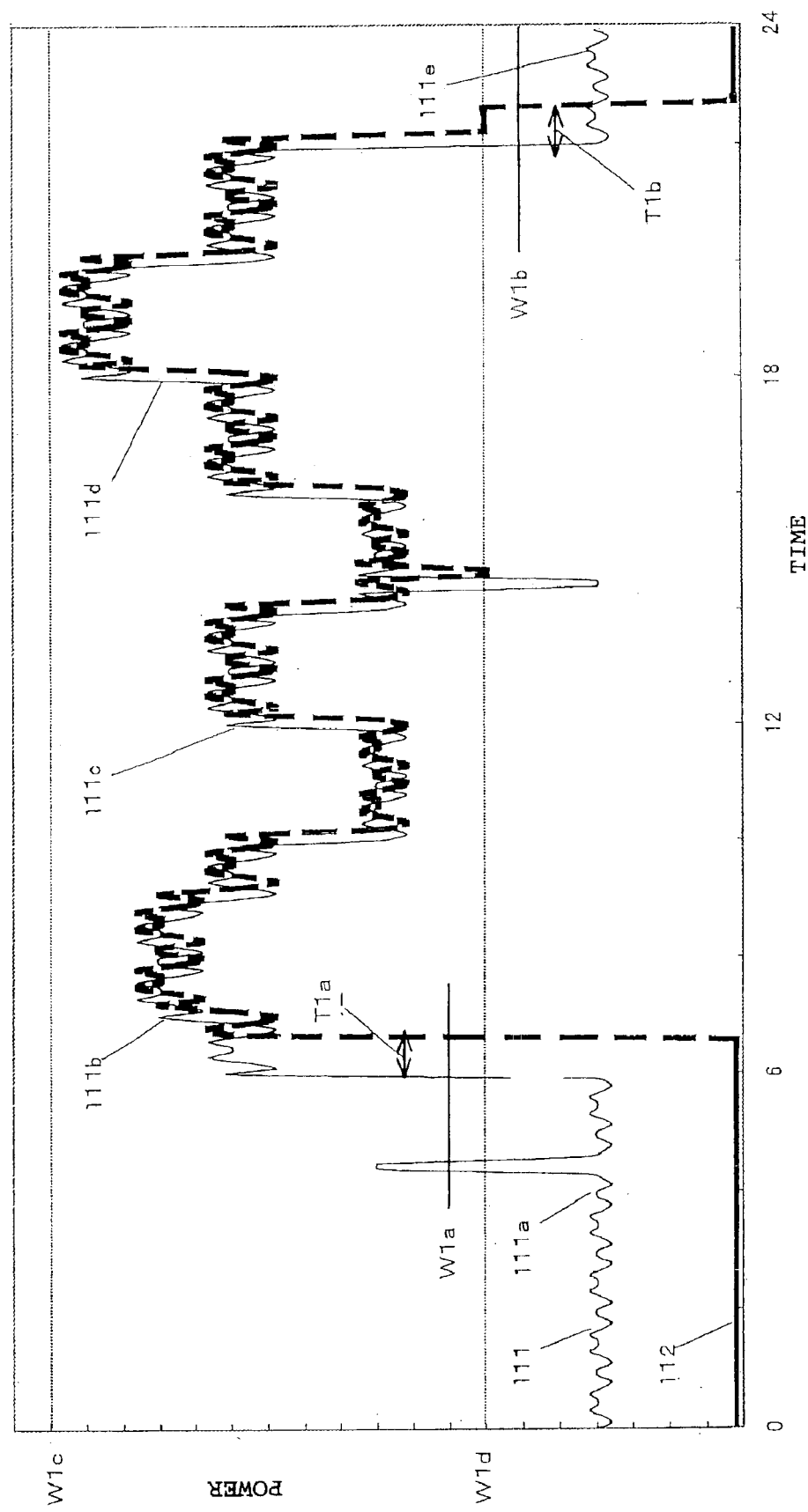
FIG. 5 is a graph for explanation of an example of an operation pattern of a fuel cell power generation system according to a third embodiment of the present invention.

Then, the operations of the fuel cell power generation system according to the third embodiment of the present invention are described below by referring to FIG. 5 showing a graph for explanation of an example of an operation pattern of the fuel cell power generation system according to the third embodiment of the present invention.

The output control means 102 controls the activation stop of the system, and the output power of the fuel cell body 101 so that the power of the load 104 detected by the load detection means 103 can be followed (when the output power of the fuel cell body 101 cannot follow the power of the load 104, the excess power and shortfall power are buffered by the charge and discharge of the battery 105).

An example of an operation pattern shown in FIG. 5 is a model of an operation pattern of a common home in a day. The horizontal and vertical axes respectively indicate time and power. Reference numerals 111 and 112 respectively denote load power and output power.

Load power 111 is high in the morning 111$b$, afternoon 111$c$, and evening 111$d$, and low at midnight 111$e$ and in the early morning 111$a$.

On the other hand, the operation of the fuel cell body 101 is controlled by the output control means 102 such that the output power 112 following the load power 111 can be obtained between maximum output power W1$c$ and minimum output power W1$d$.

According to the third embodiment of the present invention, when the load power 111 transfers, for example, from the low level in the early morning 111$a$, etc. to the high level in the morning 111$b$, etc., and when the load power not less than a predetermined value W1$a$ is maintained for not less than a predetermined time T1$a$, the system is activated. In contrast, when the load power 111 transfers, for example, from the high level in the evening 111$d$, etc. to the low level at midnight 111$e$, etc., and, for example, when the load power lower than a predetermined value W1$b$ is maintained for not less than a predetermined time T1$b$, the system is stopped.

Although there arises an instant rise or drop of a power load, an unnecessary activating (stopping) operation can be prevented by the control of the operation in which power generation is started (or stopped) when continuously accumulated time exceeds (or falls below) a predetermined threshold, thereby successfully performing one activating (stopping) operation in one day. That is, the waste of energy during the activating/stopping operation can be minimized.

Embodiment 4

Figure 6:
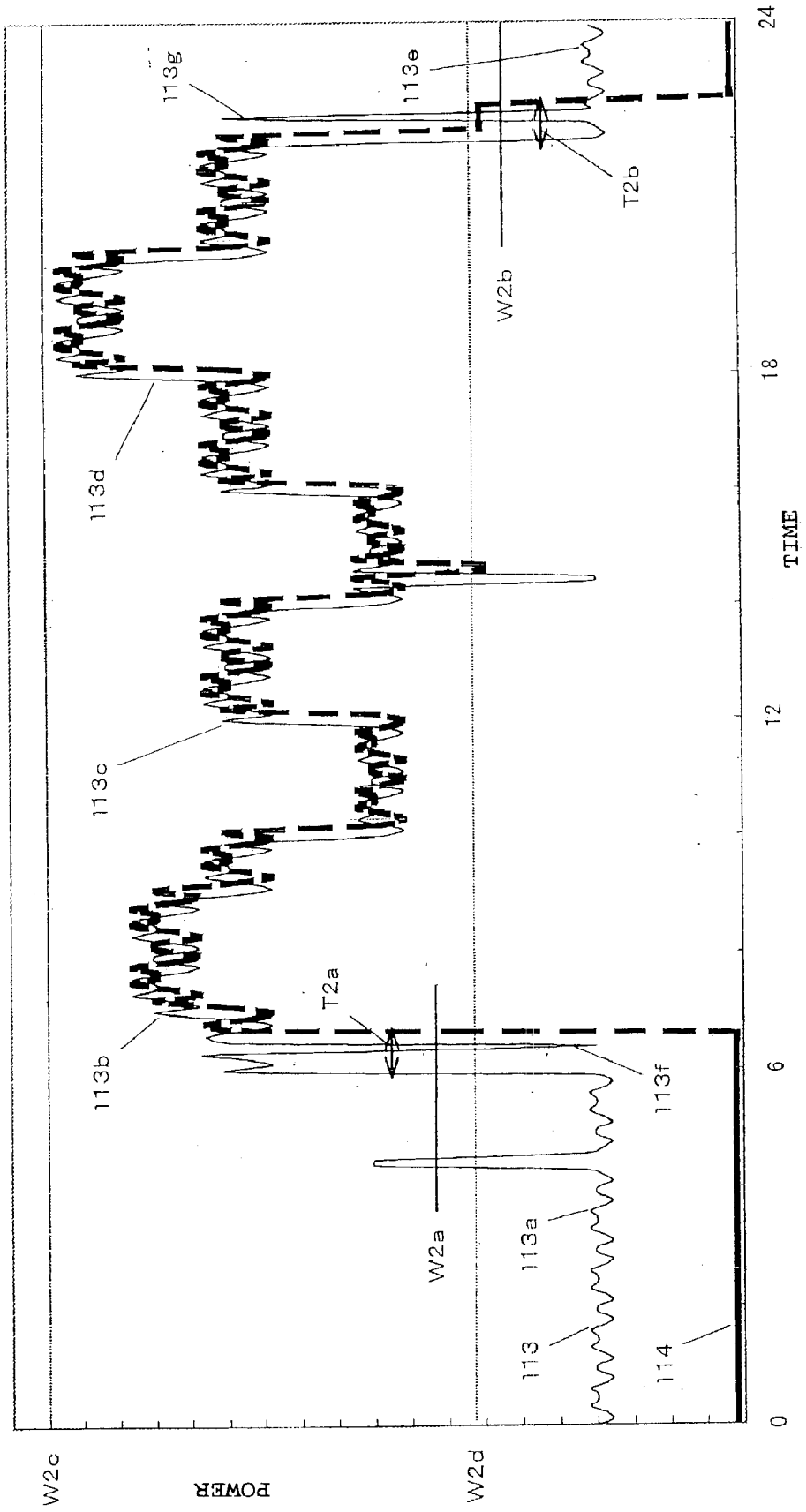
FIG. 6 is a graph for explanation of an example of an operation pattern of a fuel cell power generation system according to a fourth embodiment of the present invention.

The configuration and the operation of the fuel cell power generation system according to the fourth embodiment of the present invention is described below by referring to FIG. 6 which is a graph for explanation of an example of an operation pattern of the fuel cell power generation system according to the fourth embodiment of the present invention.

The configuration and the operations of the fuel cell power generation system according to the fourth embodiment of the present invention are similar to the configuration and the operations of the fuel cell power generation system according to the third embodiment of the present invention. In FIG. 6, the horizontal and vertical axes respectively indicate time and power. Reference numerals 113 and 114 respectively denote load power and output power. The load power 113 is high in the morning 113$b$, afternoon 113$c$, and evening 113$d$, and is low at midnight 113$e$ and in the early morning 113$a$.

However, according to the fourth embodiment of the present invention, the operation of the fuel cell body is controlled by the output control means such that the output power 114 following the load power 113 can be obtained between maximum output power W2c and minimum output power W2d.

When the load power 113 transfers from the low level in the early morning 113a, etc. to the high level in the morning 113b, etc., and when the load power not less than a predetermined value W2a is generated at a predetermined or higher ratio R2a in a predetermined time T2a, the system is activated. When the load power 113 transfers from the high level in the evening 113d, etc. to the low level at midnight 113e, and when the load power at or below a predetermined value W2b is generated at a predetermined or higher ratio R2b in a predetermined time T2b, the system is stopped.

For example, when R2a=70%, the system is activated when the load power at or over the predetermined value W2a is generated over 70% in the predetermined time T2a in the activating operation. Therefore, an instant value of the load power 113 falls not more than W2a in the activation discrimination time (T2a) in 113f, it is ignored (little influenced). In contrast, when R2b=70%, the system is stopped when the load power at or below the predetermined value W2b is generated over 70% in the predetermined time T2b in the stopping operation. Therefore, an instant value of the load power 113 falls not less than W2b in the stop discrimination time (T2b) in 113g, it is ignored.

As described above, by controlling the operation of starting (stopping) generation of power when (1) the total period of continuously accumulated time or (2) the total period of discontinuously accumulated time exceeds (falls below) a predetermined threshold, an unnecessary activating (stopping) operation can be prevented, and one activating (stopping) operation can be performed in one day. That is, the waste of energy during the activating/stopping operation can be minimized (it is obvious that the output of the time accumulation means (corresponding to the means included in the output control means according to the fourth embodiment) according to the present invention can be a total time in a predetermined period, or can be each time before computing the total value).

Furthermore, as compared with the above mentioned third embodiment of the present invention, the required amount of accumulation of the battery can be reduced by reducing the shortfall of the power due to the delay of activation or the excess power due to the delay of a stopping operation, thereby realizing a lower cost system.

Embodiment 5

Figure 7:
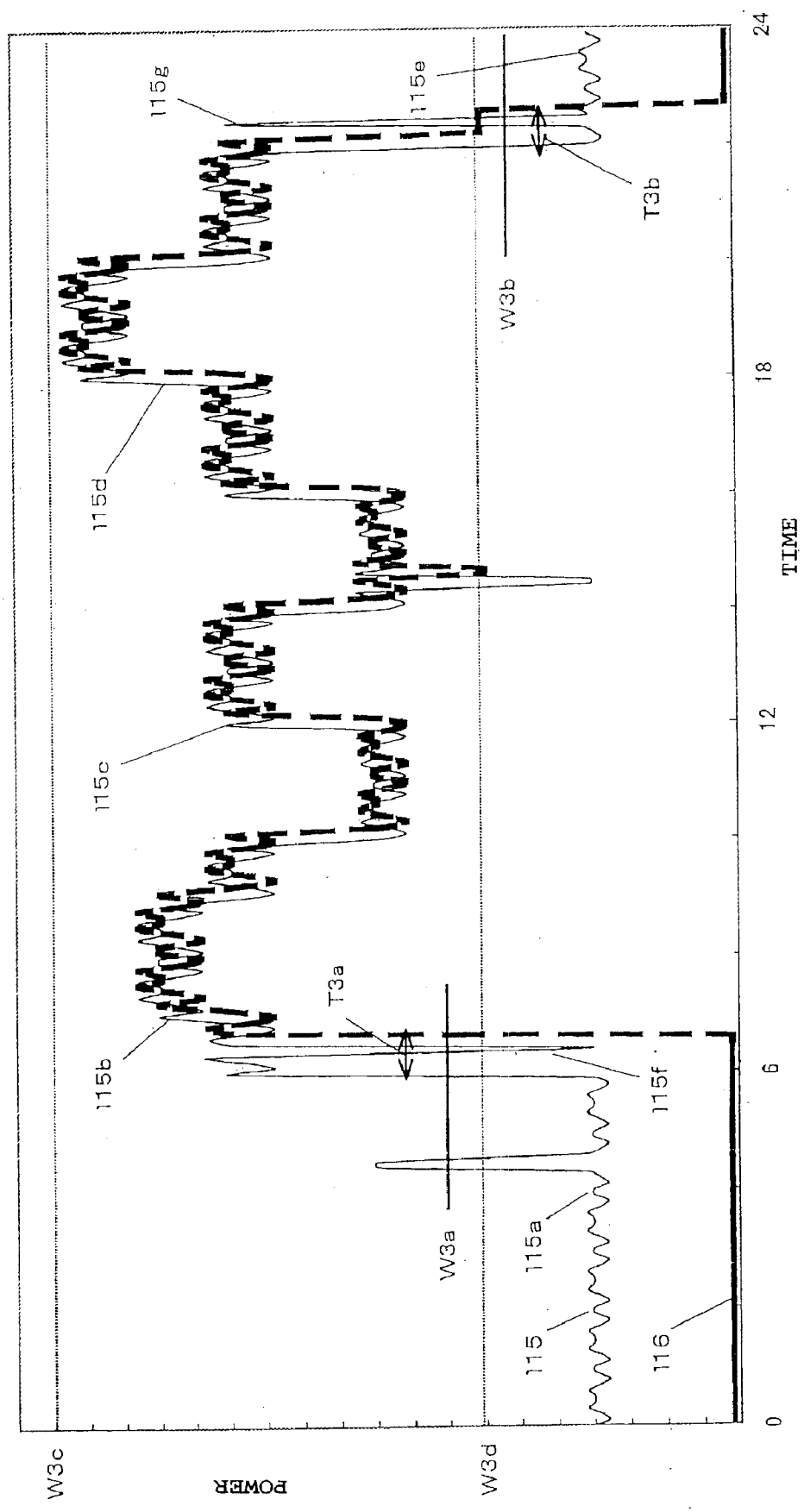
FIG. 7 is a graph for explanation of an example of an operation pattern of a fuel cell power generation system according to a fifth embodiment of the present invention.

The configuration and the operation of the fuel cell power generation system according to a fifth embodiment of the present invention will be described below by referring to FIG. 7 which is a graph for explanation of an example of an operation pattern of the fuel cell power generation system according to the fifth embodiment of the present invention.

The configuration and the operations of the fuel cell power generation system according to the fifth embodiment of the present invention are similar to the configuration and the operations of the fuel cell power generation system according to the third embodiment of the present invention (the output control means according to the fifth embodiment corresponds to the power generation control means and power accumulation means according to the present invention). In FIG. 7, the horizontal and vertical axes respectively indicate time and power. Reference numerals 115 and 116 respectively denote load power and output power. The load power 115 is high in the morning 115b, afternoon 115c, and evening 115d, and is low at midnight use and in the early morning 115a.

However, according to the fifth embodiment of the present invention, the operation of the fuel cell body is controlled by the output control means such that the output power 116 following the load power 115 can be obtained between maximum output power W3c and minimum output power W3d.

When the load power 115 transfers from the low level in the early morning 115a, etc. to the high level in the morning 115b, etc., and when the average load power obtained by dividing a load power accumulation amount by a time exceeds a predetermined value W3a in a predetermined time T3a, the system is activated. When the load power 115 transfers from the high level in the evening 115d, etc. to the low level at midnight 115e, and when the average load power obtained by dividing a load power accumulation amount by a time falls not more than a predetermined value W3b in a predetermined time T3b, the system is stopped.

Therefore, a value of the load power 115 falls for a moment in the activation discrimination time (T3a) in 115f, it is ignored. Likewise, a value of the load power 115 rises for a moment in the stop discrimination time (T3b) in 115g, it is ignored.

Thus, by controlling the operation of starting (stopping) generation of power when the accumulated power exceeds (falls below) a predetermined threshold, an unnecessary activating (stopping) operation can be prevented, and one activating (stopping) operation can be performed in one day. That is, the waste of energy during the activating/stopping operation can be minimized.

Furthermore, the delay of activation and stop can be reduced as compared with the cases according to the above mentioned third embodiment and the required amount of accumulation of the battery can be reduced by reducing the shortfall of the power due to the delay of activation or the excess power due to the delay of a stopping operation, thereby realizing a lower cost system.

Embodiment 6

Figure 8:
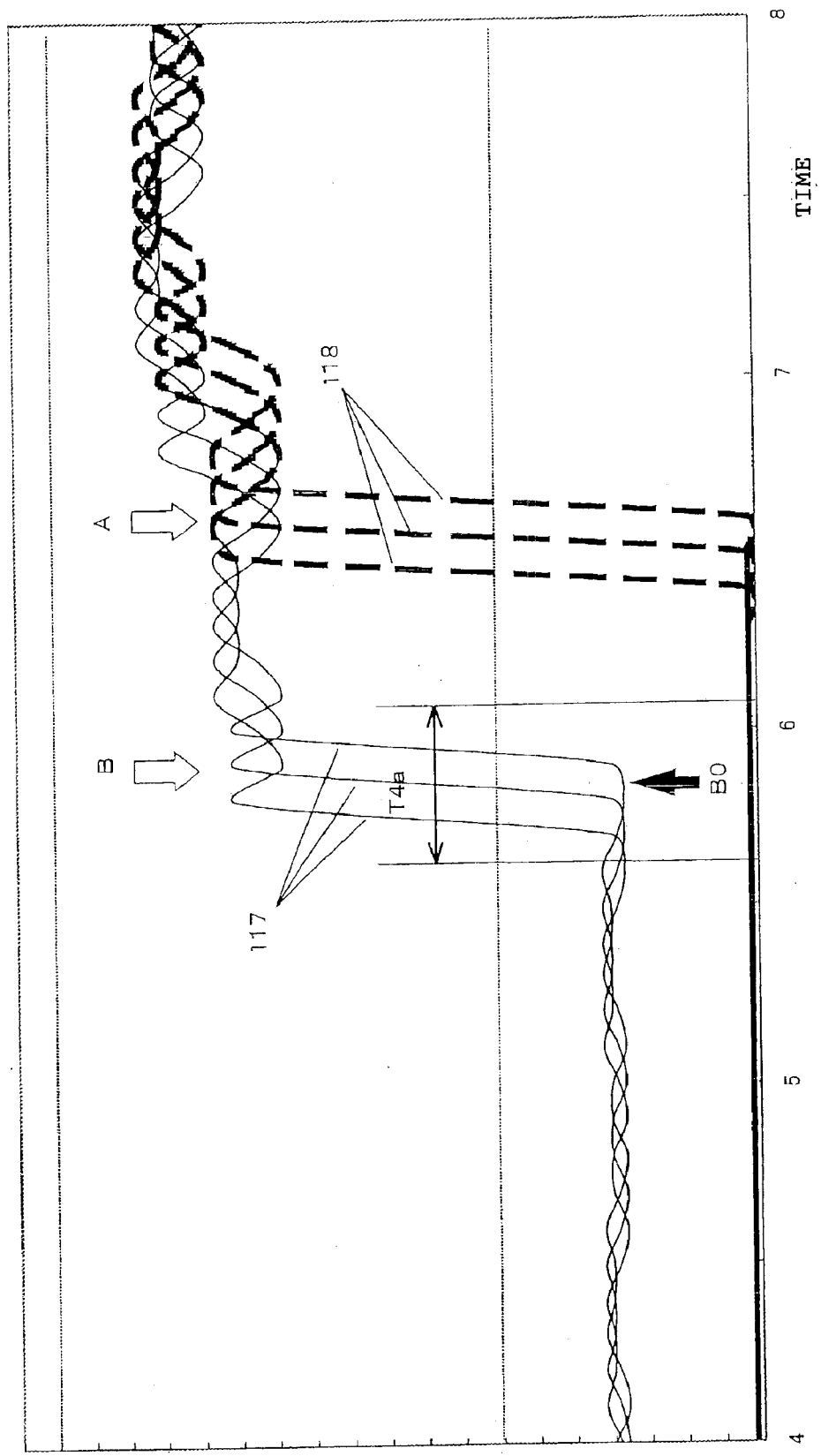
FIG. 8 is a graph for explanation of an example of an operation pattern of a fuel cell power generation system according to a sixth embodiment of the present invention.

The configuration and the operation of the fuel cell power generation system according to the fourth embodiment of the present invention is described below by referring to FIG. 8 which is a graph for explanation of an example of an operation pattern of the fuel cell power generation system according to the sixth embodiment of the present invention.

The configuration and the operations of the fuel cell power generation system according to the sixth embodiment of the present invention are similar to the configuration and the operations of the fuel cell power generation system according to the third embodiment of the present invention (the output control means according to the sixth embodiment corresponds to the power generation control means and means including record accumulation means according to the present invention). In FIG. 8, the horizontal and vertical axes respectively indicate time and power.

However, the output control means according to the present invention computes the optimum daily activation time B with the time at which system was to be activated taken into account, and when predetermined number of days in the stored optimum activation time B enters the range of a predetermined time T4a, it computes an average time B0 of the optimum activation times B, and activates the system (reference numerals 117 and 118 respectively denote load power including values for the days, and output power also including values for the days).

By performing, with advantage over a predetermined rule (for example, a rule in one of the above mentioned conventional technologies can be used) for generating power, the control of the start of generating power based on the accumulated record, the delay of activation can be reduced as compared with the cases according to the above mentioned third through fifth embodiments, and the required amount of accumulation of the battery can be further reduced.

Embodiment 7

Figure 9:
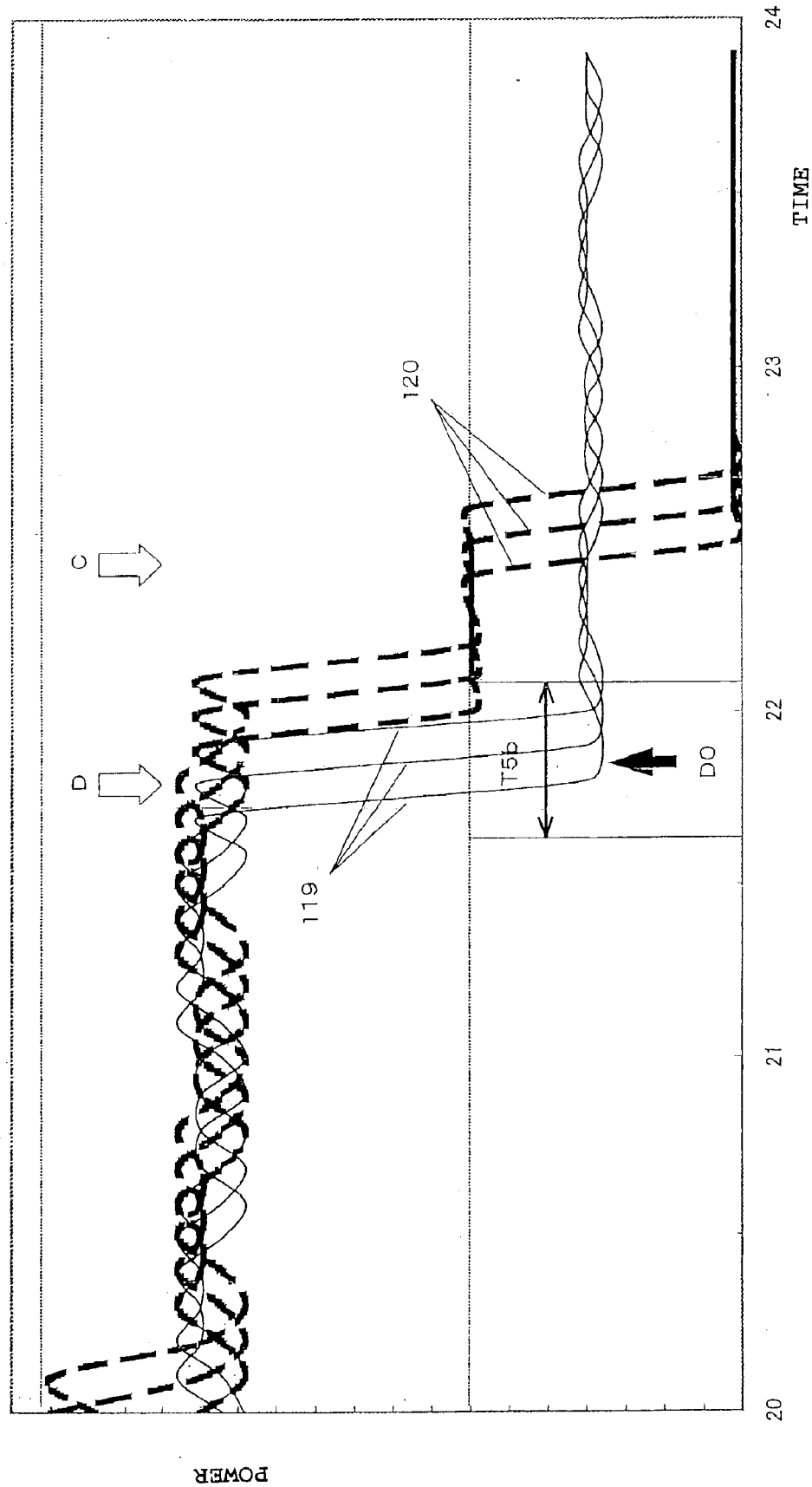
FIG. 9 is a graph for explanation of an example of an stopping pattern of a fuel cell power generation system according to a seventh embodiment of the present invention.

The configuration and the operation of the fuel cell power generation system according to the seventh embodiment of the present invention is described below by refering to FIG. 9 which is a graph for explanation of an example of a stopping pattern of the fuel cell power generation system according to the seventh embodiment of the present invention.

However, the output control means according to the present invention computes the optimum daily stop time D with the time at which system was to be stopped taken into account, and when predetermined number of days in the stored optimum stop time D enters the range of a predetermined time T5$b$, it computes an average time D0 of the optimum stop times D, and stops the system (reference numerals 119 and 120 respectively denote load power including values for the days, and output power also including values for the days).

By performing, with advantage over a predetermined rule for generating power, the control of the end of generating power based on the accumulated record, the delay of stop can be reduced as compared with the cases according to the above mentioned third through fifth embodiments, and the requirements for the battery can be further reduced.

Described above are the first to seventh embodiment of the present invention.

In short, the present invention includes a power generation control system which comprises power detection means of detecting power requested by a load and power generation control means of controlling predetermined power generation means of generating all or a part of power to be supplied to a load using a command value generated based on an average value of the detected power in a first predetermined period in each second period (it is obvious that the predetermined power generation means is a fuel cell, and the excess or shortfall of the generated power relative to the requested power is adjusted using system power and/or battery).

The present invention also includes a power generation control system which comprises power detection means of detecting power requested by a load, time accumulation means of accumulating a time at which power requested by the detected load indicates a value equal to or larger than a predetermined value when predetermined power generation means does not generate power to be supplied to the load, and power generation control means of allowing the power generation means to start generating the power to be supplied to the load using a predetermined rule based on an accumulation result.

The present invention also includes a power generation control system which comprises power detection means of detecting power requested by a load, time accumulation means of accumulating a time at which power requested by the detected load indicates a value equal to or smaller than a predetermined value when predetermined power generation means generates power to be supplied to the load, and power generation control means of allowing the power generation means to stop generating the power to be supplied to the load using a predetermined rule based on an accumulation result.

The present invention also includes a power generation control system which comprises power detection means of detecting power requested by a load, power accumulation means of accumulating power requested by the load in a predetermined period when predetermined power generation means does not generate power to be supplied to the load, and power generation control means of allowing the power generation means to start generating the power to be supplied to the load using a predetermined rule based on an accumulation result.

The present invention also includes a power generation control system which comprises power detection means of detecting power requested by a load, power accumulation means of accumulating power requested by the load in a predetermined period when predetermined power generation means generates power to be supplied to the load, and power generation control means of allowing the power generation means to stop generating the power to be supplied to the load using a predetermined rule based on an accumulation result.

The present invention further includes a power generation control system which comprises record accumulation means of accumulating a record of power requested by the load when predetermined power generation means generates power to be supplied to the load according to a predetermined rule, and power generation control means of allowing the power generation means to start or stop generating power to be supplied to the load according to the accumulated record by priority over the rule.

The present invention can also be a program used to direct a computer to perform the functions of all or a part of means (or devices, elements, circuits, units, etc.) of the power generation control system according to the present invention, and a program cooperating with the computer. It is obvious that the computer according to the present invention can include not only purely hardware such as a CPU but also firmware, an OS, and peripheral units.

Furthermore, the present invention can also be a program used to direct a computer to perform the operations of all or a part of steps (or processes, operations, effects, etc.) of the power generation control method according to the present invention, and a program cooperating with the computer.

A part of the means (or devices, elements, circuits, unit, etc.) of the present invention, and a part of the steps (or processes, operations, effects, etc.) indicate some means or steps in the plurality of means or steps, or a part of the functions or a part of the operations in one means or step.

A part of the devices (or elements, circuit, units, etc.) of the present invention indicate some devices in the plurality of devices, or a part of the means (or elements, circuits, units, etc.) in one device, or indicate a part of the functions in one means.

The present invention further includes a computer-readable storage medium storing a program according to the present invention. An embodiment of the program according to the present invention can be stored in a computer-readable storage medium, and coordinate with the computer. An embodiment of the program according to the present invention can also be transmitted through a transmission medium, read by the computer, and cooperate with the computer. A storage medium can be ROM, etc., and a transmission medium can be a transmission medium such as Internet, etc., light, electric wave, sound wave, etc.

The configuration of the present invention can be realized by either software or hardware.

The present invention can also be a storage medium storing program used to direct a computer to perform the functions of all or a part of means of all or a part of the power generation control system according to the present invention, and a computer-readable storage medium, and the program can cooperate with the computer to perform the above mentioned functions.

The present invention can also be a storage medium storing program used to direct a computer to perform the operations of all or a part of steps of all or a part of the power generation control method according to the present invention, and a computer-readable storage medium, and the program can cooperate with the computer to perform the above mentioned operations.

Thus, the present invention is a fuel cell power generation system comprising, for example, a fuel cell body, and output control means of activating/stopping the system and controlling output power of the fuel cell body such that the load power detected by load detection means can be followed, activates the system when the load power not less than a predetermined value W1$a$ continues longer than a predetermined time T1$a$, and stops the system when the load power lower than a predetermined value W1$b$ continues longer than a predetermined time T1$b$.

Additionally, the present invention is a fuel cell power generation system comprising, for example, a fuel cell body, and output control means of activating/stopping the system and controlling output power of the fuel cell body such that the load power detected by load detection means can be followed, activates the system when load power not less than a predetermined value W2$a$ is generated at a ratio higher than a predetermined ratio R2$a$ in a predetermined time T2$a$, and stops the system when load power not more than a predetermined value W2$b$ is generated at a ratio higher than a predetermined ratio R2$b$ in a predetermined time T2$b$.

Furthermore, the present invention is a fuel cell power generation system comprising, for example, a fuel cell body, and output control means of activating/stopping the system and controlling output power of the fuel cell body such that the load power detected by load detection means can be followed, activates the system when the average load power obtained by dividing a load power accumulation amount by a time exceeds a predetermined value W3$a$ in a predetermined time T3$a$, and stops the system when the average load power obtained by dividing a load power accumulation amount by a time falls below a predetermined value W3$b$ in a predetermined time T3$b$.

The present invention is the fuel cell power generation system which sets an optimum activation time at a daily activation time, and activates the system at an average time of the optimum activation time when the difference among the optimum activation times stored every day becomes in the range of a predetermined time T4$a$.

The present invention is the fuel cell power generation system which sets an optimum stop time at a daily stop time, and stops the system at an average time of the optimum stop time when the difference among the optimum stop times stored every day becomes in the range of a predetermined time T5$b$.

Furthermore, the present invention is a fuel cell power generation device characterized by a configuration of, for example, a fuel cell stack for generating DC power by having the hydrogen supplied by hydrogen supply means react with oxygen in the air supplied by air supply means, a power control device for controlling the DC power generated by the fuel cell stack, a flow rate control device for controlling the hydrogen flow rate supplied by the hydrogen supply means depending on the DC power value set by the power control device, and the air flow rate supplied by air supply means, a power conversion device for converting the DC power generated by the fuel cell stack into the AC power of substantially the same voltage as the system power, an output line for connecting the power conversion device with an external power load, load power detection means of detecting external load power, a system power connection line for connecting the output line with the system power, and an output command device connected to the power control device and the load power detection means. With the configuration, the output command device computes the average power W1 in the time period T1 of the load power detected by the load power detection means, adds the power conversion efficiency, etc. to the W1 to obtain an output command value, and sets the output command value as a DC power value set each time T2 by the power control device.

Furthermore, the present invention is a fuel cell power generation device characterized by a configuration of, for example, a fuel cell stack for generating DC power by having the hydrogen supplied by hydrogen supply means react with oxygen in the air supplied by air supply means, a power control device for controlling the DC power generated by the fuel cell stack, a flow rate control device for controlling the hydrogen flow rate supplied by the hydrogen supply means depending on the DC power value set by the power control device, and the air flow rate supplied by air supply means, a power conversion device for converting the DC power generated by the fuel cell stack into the AC power of substantially the same voltage as the system power, an output line for connecting the power conversion device with an external power load, load power detection means of detecting external load power, a system power connection line for connecting the output line with the system power, a accumulation amount control device branched and connected from the connection line connecting the power control device with the power conversion device, accumulation amount detection means, accumulation means, and an output command device connected to the power control device, the load power detection means, the accumulation amount control device, and the accumulation amount detection means. With the configuration, the accumulation amount control device controls the output command device to compute the average power W1 in the time period T1 of the load power detected by the load power detection means, obtain W3 (=W1+W2) by adding the power W2 (=Q3/T2) obtained by dividing the shortage of accumulation Q3 (=Q2−Q1), which is the difference between the current amount of accumulation Q1 detected by the accumulation amount detection means and the target amount of accumulation Q2 by the time T2, to the W1, add the power conversion efficiency, etc. to the W3 as an output command value, and accumulate the shortage of accumulation Q3 in the accumulation means.

Thus, although there arises an instant rise or drop of a power load, an unnecessary activating/stopping operation can be prevented, thereby successfully performing one activating and stopping operation in one day. That is, the waste of energy during the activating/stopping operation can be minimized.

Additionally, the required amount of accumulation of the battery can be reduced by reducing the shortfall of the power due to the delay of activation or the excess power due to the delay of a stopping operation, thereby realizing a lower cost system.

The entire disclosure of the above mentioned documents are incorporated herein by reference in its entirety.

Industrial Application

As described above, it is apparent that the present invention has the merit of improving the efficiency and suppressing the reduction of the durability by, for example, guaranteeing a stable operation of a fuel cell power generation device.

Furthermore, the present invention has also a merit of minimizing the waste of energy in generating a fuel power although there arises an instant rise or drop of a power load.

What is claimed is:

1. A power generation control system, comprising:
   power detection means of detecting power requested by a load;
   time accumulation means of accumulating a time at which the detected power requested by the load is equal to or larger than a predetermined value when predetermined power generation means does not generate power to be supplied to the load; and
   power generation control means of allowing the power generation means to start generating the power to be supplied to the load using a predetermined rule based on the accumulation result,
   wherein the predetermined rule refers to allowing the power generation means to start generating the power to be supplied to the load when (1) a total period of the time continuously accumulated in a predetermined period or (2) a total period of the time discontinuously accumulated in a predetermined period exceeds a predetermined threshold.

2. The power generation control system according to claim 1, wherein said time accumulation means outputs (1) the total period of the time continuously accumulated in the predetermined period or (2) the total period of the time discontinuously accumulated in the predetermined period as a result of the accumulation.

3. The power generation control system according to claim 1, further comprising:
   record accumulation means of accumulating a record of the power requested by the load when the predetermined power generation means generates the power to be supplied to the load according to the predetermined rule,
   wherein said power generation control means allows the power generation means to start or stop generating the power to be supplied to the load according to the accumulated record by priority over the predetermined rule.

4. The power generation control system according to claim 3, wherein:
   a time at which the power generation means is allowed to start or stop generating the power to be supplied to the load is computed based on the accumulated record; and
   the power generation means is allowed to start or stop generating the power to be supplied to the load substantially at the computed time.

5. A computer program product being used to direct a computer to function as all or a part of the power generation control system according to claim 3, further comprising:
   record accumulation means of accumulating a record of the power requested by the load when the predetermined power generation means generates the power to be supplied to the load according to the predetermined rule.

6. A computer-processible medium storing a program being used to direct a computer to function as all or a part of the power generation control system according to claim 3, further comprising:
   record accumulation means of accumulating a record of power requested by the load when the predetermined power generation means generates the power to be supplied to the load according to the predetermined rule.

7. A computer program product being used to direct a computer to function as all or a part of the power generation control system according to claim 1, comprising:
   power detection means of detecting power requested by the load;
   time accumulation means of accumulating a time at which the detected power requested by the load indicates a value equal to or larger than the predetermined value when predetermined power generation means does not generate power to be supplied to the load; and
   power generation control means of allowing the power generation means to start generating the power to be supplied to the load using the predetermined rule based on the accumulation result.

8. A computer-processibie medium storing a program being used to direct a computer to function as all or a part of the power generation control system according to claim 1, comprising:
   power detection means of detecting power requested by a load;
   time accumulation means of accumulating a time at which the detected power requested by the load indicates a value equal to or larger than a predetermined value when predetermined power generation means does not generate power to be supplied to the load; and
   power generation control means of allowing the power generation means to start generating the power to be supplied to the load using a predetermined rule based on the accumulation result.

9. The power generation control system according to claim 1, wherein:
   said predetermined power generation means is a fuel cell; and excess or shortfall of the generated power relative to the requested power is adjusted using system power and/or battery.

10. A power generation control method, comprising the steps of:
    detecting power requested by a load;
    accumulating a time when the detected power requested by the load indicates a value equal to or larger than a predetermined value when a power generator does not generate power to be supplied to the load; and
    allowing the power generator to start generating the power to be supplied to the load using a predetermined rule based on the accumulation result,
    wherein the predetermined rule refers to allowing the power generator to start generating the power to be supplied to the load when (1) a total period of the time continuously accumulated in a predetermined period or (2) a total period of the time discontinuously accumulated in a predetermined period exceeds a predetermined threshold.

11. The power generation control method according to claim 10, further comprising the steps of:
    accumulating a record of the power requested by the load when the power generator generates the power to be supplied to the load according to the predetermined rule; and
    allowing the power generator to start or stop generating the power to be supplied to the load according to the accumulated record by priority over the predetermined rule.

* * * * *